(12) United States Patent
Ly et al.

(10) Patent No.: US 11,882,080 B2
(45) Date of Patent: Jan. 23, 2024

(54) PHYSICAL UPLINK CHANNEL REPETITION FOR FULL-DUPLEX COMMUNICATIONS

(71) Applicant: QUALCOMM Incorporated, San Diego, CA (US)

(72) Inventors: Hung Dinh Ly, San Diego, CA (US); Muhammad Sayed Khairy Abdelghaffar, San Jose, CA (US); Gokul Sridharan, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 193 days.

(21) Appl. No.: 17/409,103

(22) Filed: Aug. 23, 2021

(65) Prior Publication Data

US 2023/0057948 A1   Feb. 23, 2023

(51) Int. Cl.
*H04B 7/00*   (2006.01)
*H04L 5/14*   (2006.01)
*H04L 1/08*   (2006.01)

(52) U.S. Cl.
CPC . *H04L 5/14* (2013.01); *H04L 1/08* (2013.01)

(58) Field of Classification Search
CPC ... H04L 5/14; H04L 1/08; H04L 1/189; H04L 5/0044; H04L 5/0094; H04L 5/1438; H04W 72/0446; H04W 72/0453
(Continued)

(56) References Cited

U.S. PATENT DOCUMENTS 11,252,753 B2 * 2/2022 Chen .................. H04L 1/1887
2022/0182160 A1 * 6/2022 Su ....................... H04L 27/2691
(Continued)

FOREIGN PATENT DOCUMENTS

WO   WO-2021161269 A1   8/2021

OTHER PUBLICATIONS

Ericsson: "On Support of Long PUCCH Over Multiple Slots", 3GPP TSG-RAN WG1 Meeting RAN1#91, R1-1721004, 3rd Generation Partnership Project, Mobile Competence Centre, 650, Route Des Lucioles, F-06921 Sophia-Antipolis Cedex, France, vol. RAN WG1, No. Reno, Nevada, United States, Nov. 27, 2017-Dec. 1, 2017, Nov. 18, 2017, 4 Pages, XP051370367, p. 2, paragraph 2.1, Proposal 10, p. 3.

(Continued)

*Primary Examiner* — Chuong T Ho
(74) *Attorney, Agent, or Firm* — Holland & Hart LLP

(57) ABSTRACT

Methods, systems, and devices for wireless communications are described. A user equipment (UE) may receive a configuration for a set of transmission time intervals (TTIs) including at least one TTI to be used for full-duplex communications. The UE may receive control signaling that indicates a frequency domain resource allocation (FDRA) for a physical uplink channel transmission in a first TTI. The UE may determine whether a second TTI is available for transmitting one or more repetitions of the physical uplink channel transmission based on comparing the FDRA to resources allocated to the second TTI. For example, the second TTI may be available if one or more physical resource blocks (PRBs) of the FDRA are non-overlapping in a frequency domain with downlink resources allocated to the second TTI. The UE may transmit the one or more repetitions in the second TTI based on the second TTI being available.

30 Claims, 17 Drawing Sheets

(58) Field of Classification Search
USPC .......................................................... 370/277
See application file for complete search history.

(56) References Cited

U.S. PATENT DOCUMENTS

| | | | | |
|---|---|---|---|---|
| 2022/0247528 A1* | 8/2022 | Ly | ............................. | H04L 1/08 |
| 2022/0353694 A1* | 11/2022 | Ly | ...................... | H04W 72/0446 |
| 2022/0353885 A1* | 11/2022 | Cozzo | ................ | H04W 72/1268 |
| 2022/0360394 A1* | 11/2022 | Ly | ........................ | H04L 5/0053 |
| 2022/0361198 A1* | 11/2022 | Ly | ...................... | H04W 72/0446 |
| 2023/0083914 A1* | 3/2023 | Nammi | ................. | H04L 1/1822 |

OTHER PUBLICATIONS

International Search Report and Written Opinion—PCT/US2022/040743—ISA/EPO—dated Nov. 30, 2022.
Sony: "PUSCH Coverage Enhancement Techniques", 3GPP TSG-RAN WG1#103e, R1-2008370, 3rd Generation Partnership Project, Mobile Competence Centre, 650, Route Des Lucioles, F-06921 Sophia-Antipolis Cedex, France, vol. RAN WG1, No. E-meeting, Oct. 26, 2020-Nov. 13, 2020, Oct. 17, 2020, 7 Pages, XP051940110, p. 1, paragraph 1, p. 1, paragraph 2, p. 2, paragraph 4.

* cited by examiner

PHYSICAL UPLINK CHANNEL REPETITION FOR FULL-DUPLEX COMMUNICATIONS

FIELD OF TECHNOLOGY

The following relates to wireless communications, including physical uplink channel repetition for full-duplex communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, devices (e.g., base stations, UEs) may be configured to transmit repetitions of a message to increase reliability and efficiency. For instance, a receiving device may fail to receive a first repetition of a message (e.g., due to interference, blockages, or other examples), but may successfully receive a second repetition of the message. In some examples, repetitions may be supported for physical uplink channels, such as a physical uplink control channel (PUCCH) or a physical uplink shared channel (PUSCH), or both, among other channels.

SUMMARY

The described techniques relate to improved methods, systems, devices, and apparatuses that support physical uplink channel repetition for full-duplex communications. Generally, the described techniques provide for repetitions of physical uplink channel transmissions in slots configured for full-duplex communications. A UE may receive a configuration for multiple transmission time intervals (TTIs) (e.g., slots), where at least one TTI is used for full-duplex communications (e.g., the TTI is configured for simultaneous uplink and downlink communications). The UE may be configured to transmit one or more repetitions of a physical uplink channel transmission, such as a physical uplink control channel (PUCCH) transmission or a physical uplink shared channel (PUSCH) transmission. In such cases, the UE may determine whether a given TTI is available to use for a physical uplink channel repetition based on resource allocations (e.g., a frequency domain resource allocation (FDRA), a time domain resource allocation (TDRA)) of the physical uplink channel transmission and resource allocations of the TTI, e.g., based on the configuration of the TTI. For instance, the TTI may be a full-duplex TTI (e.g., a slot configured for full-duplex communications) and may be configured to include resources allocated for both uplink transmissions and downlink transmissions, among other examples. The UE may determine whether a resource allocation of the physical uplink channel transmission overlaps with resources of the full-duplex TTI allocated for transmissions in a direction other than uplink. If the resources are non-overlapping, the UE may transmit repetitions of the physical uplink channel transmission in the full-duplex TTI.

In some implementations, if the resources are overlapping, the UE may refrain from using the full-duplex TTI for a repetition, while in other examples, the UE may adapt the repetition to the full-duplex TTI. For instance, the UE may transmit portions of the repetition that map to the non-overlapping resources (e.g., the UE may refrain from transmitting portions of the repetition that map to the overlapping resources) or may perform rate matching to transmit the entire repetition within the non-overlapping resources. In some examples, the UE may be configured with a resource allocation for transmissions a full-duplex TTI and a resource allocation for transmission in a non-full-duplex TTI, and the UE may transmit repetitions of the physical uplink channel transmission in respective TTIs based on the corresponding resource allocation.

A method for wireless communications at a UE is described. The method may include receiving a configuration for a set of multiple TTIs that include at least one TTI for full-duplex communications, receiving control signaling indicating a first FDRA for transmitting a physical uplink channel in a first TTI of the set of multiple TTIs, determining that a second TTI of the set of multiple TTIs is available for a transmission of the physical uplink channel based on a comparison between the first FDRA and resources of the second TTI that are allocated for transmissions different from an uplink transmission, the second TTI being configured for the full-duplex communications, and transmitting one or more repetitions of the physical uplink channel over at least the first TTI and the second TTI based on the determination that the second TTI is available.

An apparatus for wireless communications at a UE is described. The apparatus may include a processor, memory coupled with the processor, and instructions stored in the memory. The instructions may be executable by the processor to cause the apparatus to receive a configuration for a set of multiple TTIs that include at least one TTI for full-duplex communications, receive control signaling indicating a first FDRA for transmitting a physical uplink channel in a first TTI of the set of multiple TTIs, determine that a second TTI of the set of multiple TTIs is available for a transmission of the physical uplink channel based on a comparison between the first FDRA and resources of the second TTI that are allocated for transmissions different from an uplink transmission, the second TTI being configured for the full-duplex communications, and transmit one or more repetitions of the physical uplink channel over at least the first TTI and the second TTI based on the determination that the second TTI is available.

Another apparatus for wireless communications at a UE is described. The apparatus may include means for receiving a configuration for a set of multiple TTIs that include at least one TTI for full-duplex communications, means for receiving control signaling indicating a first FDRA for transmitting a physical uplink channel in a first TTI of the set of multiple TTIs, means for determining that a second TTI of the set of multiple TTIs is available for a transmission of the physical uplink channel based on a comparison between the first FDRA and resources of the second TTI that are allocated for transmissions different from an uplink transmission, the second TTI being configured for the full-duplex communications, and means for transmitting one or more repetitions of the physical uplink channel over at least the first TTI and the second TTI based on the determination that the second TTI is available.

A non-transitory computer-readable medium storing code for wireless communications at a UE is described. The code may include instructions executable by a processor to receive a configuration for a set of multiple TTIs that include at least one TTI for full-duplex communications, receive control signaling indicating a first FDRA for transmitting a physical uplink channel in a first TTI of the set of multiple TTIs, determine that a second TTI of the set of multiple TTIs is available for a transmission of the physical uplink channel based on a comparison between the first FDRA and resources of the second TTI that are allocated for transmissions different from an uplink transmission, the second TTI being configured for the full-duplex communications, and transmit one or more repetitions of the physical uplink channel over at least the first TTI and the second TTI based on the determination that the second TTI is available.

In some examples of the method, apparatuses, and non-transitory computer-readable medium described herein, determining that the second TTI may be available may include operations, features, means, or instructions for determining, based on the comparison, that one or more PRBs indicated by the first FDRA may be non-overlapping in a frequency domain with downlink resources of the second TTI, where at least one repetition of the physical uplink channel may be transmitted in the second TTI.

Some examples of the method, apparatuses, and non-transitory computer-readable medium described herein may further include operations, features, means, or instructions for determining a second FDRA for transmitting the physical uplink channel in the second TTI based on the first FDRA for transmitting the physical uplink channel in the first TTI, where at least one repetition of the one or more repetitions may be transmitted in the second TTI based on the second FDRA.

Some examples of the method, apparatuses, and non-transitory computer-readable medium described herein may further include operations, features, means, or instructions for receiving, via the control signaling, an indication of the second FDRA, where determining the second FDRA may be based on receiving the indication.

Some examples of the method, apparatuses, and non-transitory computer-readable medium described herein may further include operations, features, means, or instructions for calculating uplink resources of the second FDRA based on a frequency offset with respect to one or more resources indicated by the first FDRA.

Some examples of the method, apparatuses, and non-transitory computer-readable medium described herein may further include operations, features, means, or instructions for receiving a message indicating the frequency offset, where the at least one repetition of the one or more repetitions may be transmitted in the second TTI based on the message indicating the frequency offset.

In some examples of the method, apparatuses, and non-transitory computer-readable medium described herein, the frequency offset includes a predetermined frequency offset and the at least one repetition of the one or more repetitions may be transmitted in the second TTI based on the predetermined frequency offset.

In some examples of the method, apparatuses, and non-transitory computer-readable medium described herein, the second FDRA indicates uplink resources that may be non-overlapping in a frequency domain with the resources of the second TTI that may be allocated for the transmissions different from the uplink transmission.

In some examples of the method, apparatuses, and non-transitory computer-readable medium described herein, determining that the second TTI may be available may include operations, features, means, or instructions for determining that a first number of physical resource blocks (PRBs) of the second TTI may be available for the transmission of the physical uplink channel based on the second TTI being configured for the full-duplex communications, where the first number of PRBs may be different from a second number of PRBs of the first TTI, the first TTI being configured for communications different from the full-duplex communications.

In some examples of the method, apparatuses, and non-transitory computer-readable medium described herein, transmitting the one or more repetitions of the physical uplink channel may include operations, features, means, or instructions for determining that one or more resources indicated by the first FDRA may be at least partially overlapping with the resources of the second TTI that may be allocated for the transmissions different from the uplink transmission, transmitting a first repetition of the one or more repetitions of the physical uplink channel using first frequency-domain resources of the first TTI based on the first FDRA, and transmitting, based on the determination, a second repetition of the one or more repetitions of the physical uplink channel using second frequency-domain resources of the second TTI that correspond to the first frequency-domain resources based on the first FDRA.

In some examples of the method, apparatuses, and non-transitory computer-readable medium described herein, a subset of the second frequency-domain resources excludes data based on the subset overlapping with the resources of the second TTI that may be allocated for the transmissions different from the uplink transmission.

In some examples of the method, apparatuses, and non-transitory computer-readable medium described herein, transmitting the one or more repetitions of the physical uplink channel may include operations, features, means, or instructions for determining that one or more resources indicated by the first FDRA may be at least partially overlapping in a frequency domain with the resources of the second TTI that may be allocated for the transmissions different from the uplink transmission, transmitting a first repetition of the one or more repetitions of the physical uplink channel using first frequency-domain resources of the first TTI based on the first FDRA, and transmitting, based on the determination, a second repetition of the one or more repetitions of the physical uplink channel using second frequency-domain resources of the second TTI that correspond to a subset of the first frequency-domain resources based on the subset being non-overlapping in the frequency domain with the resources of the second TTI that may be allocated for the transmissions different from the uplink transmission.

In some examples of the method, apparatuses, and non-transitory computer-readable medium described herein, transmitting the one or more repetitions of the physical uplink channel may include operations, features, means, or instructions for transmitting the one or more repetitions of the physical uplink channel over at least the first TTI and the second TTI in accordance with a frequency hopping pattern.

In some examples of the method, apparatuses, and non-transitory computer-readable medium described herein, transmitting the one or more repetitions of the physical uplink channel may include operations, features, means, or instructions for transmitting a first repetition of the one or more repetitions of the physical uplink channel using a first TDRA for the first TTI and transmitting a second repetition of the one or more repetitions of the physical uplink channel using a second TDRA for the second TTI, where the second TDRA may be the same as the first TDRA.

A method for wireless communications at a base station is described. The method may include transmitting, to a UE, a configuration for a set of multiple TTIs that include at least one TTI for full-duplex communications, transmitting, to the UE, control signaling indicating a first FDRA for receiving a physical uplink channel in a first TTI of the set of multiple TTIs, determining that a second TTI of the set of multiple TTIs is available for a transmission of the physical uplink channel based on a comparison between the first FDRA and resources of the second TTI that are allocated for transmissions different from an uplink transmission, the second TTI being configured for the full-duplex communications, and receiving, from the UE, one or more repetitions of the physical uplink channel over at least the first TTI and the second TTI based on the determination that the second TTI is available.

An apparatus for wireless communications at a base station is described. The apparatus may include a processor, memory coupled with the processor, and instructions stored in the memory. The instructions may be executable by the processor to cause the apparatus to transmit, to a UE, a configuration for a set of multiple TTIs that include at least one TTI for full-duplex communications, transmit, to the UE, control signaling indicating a first FDRA for receiving a physical uplink channel in a first TTI of the set of multiple TTIs, determine that a second TTI of the set of multiple TTIs is available for a transmission of the physical uplink channel based on a comparison between the first FDRA and resources of the second TTI that are allocated for transmissions different from an uplink transmission, the second TTI being configured for the full-duplex communications, and receive, from the UE, one or more repetitions of the physical uplink channel over at least the first TTI and the second TTI based on the determination that the second TTI is available.

Another apparatus for wireless communications at a base station is described. The apparatus may include means for transmitting, to a UE, a configuration for a set of multiple TTIs that include at least one TTI for full-duplex communications, means for transmitting, to the UE, control signaling indicating a first FDRA for receiving a physical uplink channel in a first TTI of the set of multiple TTIs, means for determining that a second TTI of the set of multiple TTIs is available for a transmission of the physical uplink channel based on a comparison between the first FDRA and resources of the second TTI that are allocated for transmissions different from an uplink transmission, the second TTI being configured for the full-duplex communications, and means for receiving, from the UE, one or more repetitions of the physical uplink channel over at least the first TTI and the second TTI based on the determination that the second TTI is available.

A non-transitory computer-readable medium storing code for wireless communications at a base station is described. The code may include instructions executable by a processor to transmit, to a UE, a configuration for a set of multiple TTIs that include at least one TTI for full-duplex communications, transmit, to the UE, control signaling indicating a first FDRA for receiving a physical uplink channel in a first TTI of the set of multiple TTIs, determine that a second TTI of the set of multiple TTIs is available for a transmission of the physical uplink channel based on a comparison between the first FDRA and resources of the second TTI that are allocated for transmissions different from an uplink transmission, the second TTI being configured for the full-duplex communications, and receive, from the UE, one or more repetitions of the physical uplink channel over at least the first TTI and the second TTI based on the determination that the second TTI is available.

In some examples of the method, apparatuses, and non-transitory computer-readable medium described herein, determining that the second TTI may be available may include operations, features, means, or instructions for determining, based on the comparison, that one or more PRBs indicated by the first FDRA may be non-overlapping in a frequency domain with downlink resources of the second TTI, where at least one repetition of the physical uplink channel may be received in the second TTI.

Some examples of the method, apparatuses, and non-transitory computer-readable medium described herein may further include operations, features, means, or instructions for determining a second FDRA for receiving the physical uplink channel in the second TTI based on the first FDRA, where at least one repetition of the one or more repetitions may be received in the second TTI based on the second FDRA.

Some examples of the method, apparatuses, and non-transitory computer-readable medium described herein may further include operations, features, means, or instructions for transmitting, via the control signaling, an indication of the second FDRA, where the second FDRA may be based on transmitting the indication.

In some examples of the method, apparatuses, and non-transitory computer-readable medium described herein, resources of the second FDRA may be based on a frequency offset with respect to one or more resources indicated by the first FDRA.

Some examples of the method, apparatuses, and non-transitory computer-readable medium described herein may further include operations, features, means, or instructions for transmitting a message indicating the frequency offset, where the at least one repetition of the one or more repetitions may be received in the second TTI based on the message indicating the frequency offset.

In some examples of the method, apparatuses, and non-transitory computer-readable medium described herein, the frequency offset includes a predetermined frequency offset and the at least one repetition of the one or more repetitions may be received in the second TTI based on the predetermined frequency offset.

In some examples of the method, apparatuses, and non-transitory computer-readable medium described herein, the second FDRA indicates uplink resources that may be non-overlapping in a frequency domain with the resources of the second TTI that may be allocated for the transmissions different from the uplink transmission.

In some examples of the method, apparatuses, and non-transitory computer-readable medium described herein, determining that the second TTI may be available may include operations, features, means, or instructions for determining that a first number of PRBs of the second TTI may be available for the transmission of the physical uplink channel based on the second TTI being configured for the full-duplex communications, where the first number of PRBs may be different from a second number of PRBs of the first TTI, the first TTI being configured for communications different from the full-duplex communications.

In some examples of the method, apparatuses, and non-transitory computer-readable medium described herein, receiving the one or more repetitions of the physical uplink channel may include operations, features, means, or instructions for receiving a first repetition of the one or more repetitions of the physical uplink channel using first frequency-domain resources of the first TTI based on the first FDRA, where one or more resources indicated by the first FDRA may be at least partially overlapping with the resources of the second TTI that may be allocated for the transmissions different from the uplink transmission and receiving a second repetition of the one or more repetitions of the physical uplink channel using second frequency-domain resources of the second TTI that correspond to the first frequency-domain resources based on the first FDRA.

In some examples of the method, apparatuses, and non-transitory computer-readable medium described herein, a subset of the second frequency-domain resources excludes data based on the subset overlapping with the resources of the second TTI that may be allocated for the transmissions different from the uplink transmission.

In some examples of the method, apparatuses, and non-transitory computer-readable medium described herein, receiving the one or more repetitions of the physical uplink channel may include operations, features, means, or instructions for receiving a first repetition of the one or more repetitions of the physical uplink channel over first frequency-domain resources of the first TTI based on the first FDRA, where one or more resources indicated by the first FDRA may be at least partially overlapping in a frequency domain with the resources of the second TTI that may be allocated for the transmissions different from the uplink transmission and receiving a second repetition of the one or more repetitions of the physical uplink channel over second frequency-domain resources of the second TTI that correspond to a subset of the first frequency-domain resources based on the subset being non-overlapping in the frequency domain with the resources of the second TTI that may be allocated for the transmissions different from the uplink transmission.

In some examples of the method, apparatuses, and non-transitory computer-readable medium described herein, receiving the one or more repetitions of the physical uplink channel may include operations, features, means, or instructions for receiving the one or more repetitions of the physical uplink channel over at least the first TTI and the second TTI in accordance with a frequency hopping pattern.

In some examples of the method, apparatuses, and non-transitory computer-readable medium described herein, receiving the one or more repetitions of the physical uplink channel may include operations, features, means, or instructions for receiving a first repetition of the one or more repetitions of the physical uplink channel in accordance with a first TDRA for the first TTI and receiving a second repetition of the one or more repetitions of the physical uplink channel in accordance with a second TDRA for the second TTI, where the second TDRA may be the same as the first TDRA.

DETAILED DESCRIPTION

Figure 1:
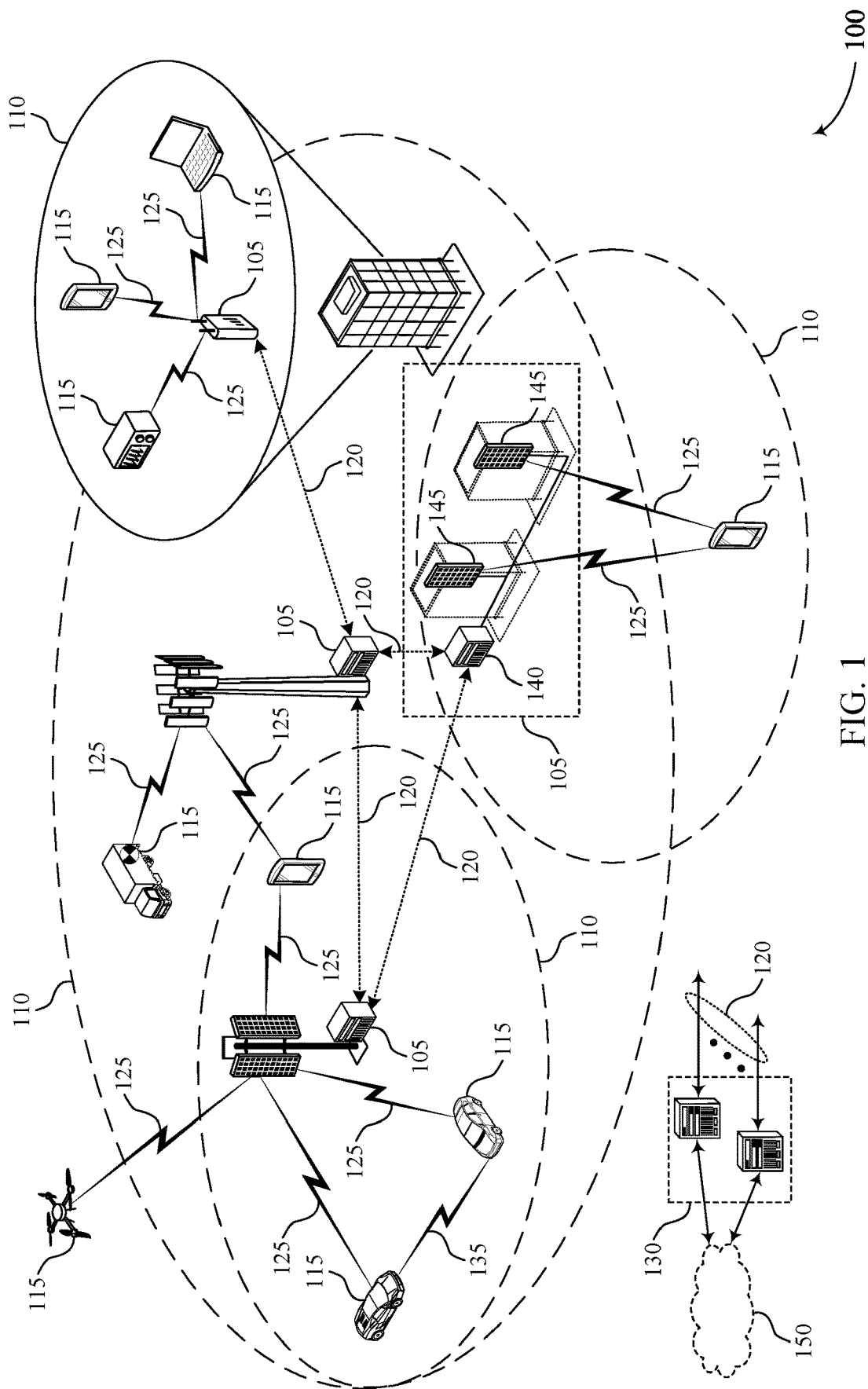
FIGS. 1 and 2 illustrate examples of wireless communications systems that supports physical uplink channel repetition for full-duplex communications in accordance with aspects of the present disclosure.

A base station may communicate with a user equipment (UE) using full-duplex communications (e.g., simultaneous uplink and downlink communications may be performed within a same time interval, such as a slot, a set of symbol periods, or the like) or half-duplex communications (e.g., only uplink or only downlink communications are performed within a same time interval). Radio frequency (RF) spectrum bands may be configured to support full-duplex communications. For example, different types of full-duplex communications may be associated with respective resource configurations, which may include uplink and downlink resources that overlap in both the time domain and frequency domain (e.g., in-band full-duplex) or uplink and downlink resources that overlap in the time domain, but are separated in the frequency domain by a guard band (e.g., sub-band full-duplex). Wireless devices that support full-duplex communication may use one or more of these types of full-duplex communications and corresponding resource configurations based on the capabilities of the device (e.g., based on hardware components and capabilities of the device to detect simultaneous uplink and downlink signals despite signals on resources that at least partially overlap).

A transmission time interval (TTI) (e.g., one or more symbol periods, a slot, or the like) may be configured (e.g., formatted) with resources (e.g., time domain resources, frequency domain resources) based on whether the communications are full-duplex or half-duplex. For instance, a TTI for half-duplex communications may be configured with either uplink resources or downlink resources, while a TTI for full-duplex communications may be configured with both uplink resources and downlink resources (e.g., and any additional resources, such as guard band resources, among other examples).

In some examples, a UE may be configured to repeat a transmission across multiple TTIs and/or frequency resources (e.g., physical resource blocks (PRBs)). For instance, in the event that a UE experiences relatively poor channel conditions, a base station may configure the UE to transmit multiple repetitions for certain communications to enhance the likelihood of successful reception of the communication. The UE may transmit a first instance of a transmission, such as a physical uplink channel transmission (e.g., a physical uplink shared channel (PUSCH), a physical uplink control channel (PUCCH)), over a first set of resources (e.g., a TTI, a subcarrier, a slot, or the like) and may transmit one or more repetitions of the first transmission over subsequent sets of resources. In some examples, the UE may determine whether a resource, such as a TTI, is available for transmitting a repetition based on a set of rules or criteria. However, in some cases, these rules may include restrictions that exclude full-duplex TTIs. For instance, some techniques may preclude the use of resources for repetitions of a physical uplink channel when at least one symbol period in a slot (e.g., indicated by a time domain resource allocation (TDRA) field) at least partially overlaps with one or more other symbol periods in the same slot not intended for uplink transmissions. In such cases, the UE may determine that a TTI is unavailable with respect to the set of rules, even if the TTI is otherwise available (e.g., when TTI includes full-duplex resources for simultaneous uplink and downlink transmissions).

The techniques described herein support criteria for availability of a TTI for repetitions of a physical uplink channel transmission such that TTIs configured for full-duplex communications may be considered. That is, the techniques described herein may enable a UE to transmit (e.g., to a base station) repetitions of a physical uplink channel transmission in a full-duplex TTI. The UE may receive a configuration for multiple TTIs including at least one full-duplex TTI. The UE may determine availability of the full-duplex TTI for repetitions of a physical uplink channel transmission by comparing a resource allocation (e.g., a frequency domain resource allocation (FDRA), a TDRA) of the physical uplink channel transmission to resource allocations of the full-duplex TTI. For instance, the UE may determine that the full-duplex TTI is available if an FDRA corresponding to the physical uplink channel transmission indicates resources that are non-overlapping with resources of the full-duplex TTI that are allocated for non-uplink transmissions (e.g., downlink transmissions). Put another way, if a repetition of the physical uplink channel transmission in the full-duplex TTI would be mapped to non-uplink resources of the full-duplex TTI, the UE may determine that the full-duplex TTI is unavailable (e.g., not to be used for a repetition).

In some cases, the UE may transmit a repetition in a full-duplex TTI based on an FDRA of the full-duplex TTI. For example, the UE may be configured with the FDRA of the physical uplink channel transmission and a second FDRA that is associated with the full-duplex TTI. The second FDRA may be based on an offset (e.g., in the frequency domain) with respect to the first FDRA. In some cases, the second FDRA may indicate uplink resources of the physical uplink channel transmission that are non-overlapping (e.g., in the frequency domain) with resources allocated for non-uplink transmissions of the full-duplex TTI.

In some implementations, the UE may transmit a repetition in a full-duplex TTI even if the resource allocation of the physical uplink channel transmission is partially overlapping with non-uplink resources in the full-duplex TTI. For example, the UE may transmit a partial transmission of the repetition in the full-duplex TTI, e.g., using only the non-overlapping resources. Alternatively, the UE may rate match the repetition to fit within the non-overlapping resources. In another example, a number of PRBs associated with the FDRA of the physical uplink channel transmission may be different than a number of PRBs available for repetition in the full-duplex TTI. The UE may transmit the repetition in the full-duplex TTI and one or more additional TTIs based on the number of PRBs.

Particular aspects of the subject matter described herein may be implemented to realize one or more advantages. The described techniques may support flexibility in defining availability of TTIs to be used for repetitions of a physical uplink channel transmission, such that a UE may select a full-duplex TTI to transmit a repetition. This may result in an increased quantity of TTIs being available for repetitions, which may improve decoding reliability and robustness, decrease device and system latency, or the like. For example, the UE may have a relatively larger pool of TTIs from which to select for a repetition, which may reduce delays associated with transmitting repetitions and increase overall efficiency. As such, supported techniques may promote device and network efficiencies, among other benefits.

Aspects of the disclosure are initially described in the context of wireless communications systems. Aspects of the disclosure are then described with respect to resource configurations and a process flow. Aspects of the disclosure are further illustrated by and described with reference to apparatus diagrams, system diagrams, and flowcharts that relate to physical uplink channel repetition for full-duplex communications.

FIG. 1 illustrates an example of a wireless communications system 100 that supports physical uplink channel repetition for full-duplex communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Additionally, or alternatively, devices in the wireless communications system 100 may transmit one or more repetitions of a message to increase the likelihood of successful reception of the message. For instance, a base station 105 may configure a UE 115 to transmit one or more repetitions of a physical uplink channel transmission, such as a PUCCH transmission or a PUSCH transmission. The UE 115 may transmit the one or more repetitions in one or more TTIs (e.g., one or more slots, one or more sets of symbols) based on determining whether a given TTI is available for a repetition.

In some examples, the UE 115 and the base station 105 may communicate according to a full-duplex configuration, where a first transmission direction occurs at a same time as a second transmission direction within a TTI configured for the full-duplex configuration, the first transmission direction being different than the second transmission direction. In some cases, the base station 105 and the UE 115 may additionally or alternatively communicate according to a half-duplex configuration, where only one transmission direction occurs in a given TTI, the TTI being configured for the half-duplex configuration. For instance, a full-duplex TTI (e.g., a slot, multiple symbol periods) may be configured (e.g., formatted) with resources (e.g., time domain resources, frequency domain resources) for both uplink and downlink communications, while a half-duplex TTI may be configured with resources for either downlink communications or uplink communications.

Full-duplex communications may be implemented using in-band full-duplex (IBFD), where transmissions in different directions are transmitted and received on a same time resource and a same frequency resource. For example, an uplink transmission and a downlink transmission may be transmitted on resources that at least partially overlap in the time domain and the frequency domain. Alternatively, full-duplex communications may be sub-band full-duplex (SBFD), where transmissions in different directions are transmitted and received on different frequency resources but a same (e.g., shared) time resource. SBFD may enable frequency division duplexing (FDD), where downlink and uplink transmissions are simultaneously transmitted and received using different subbands. For instance, a TTI formatted (e.g., configured) for SBFD communications may include a subset of frequency resources (e.g., subbands) for downlink communications, a subset of frequency resources for uplink communications, and, in some examples, one or more other subsets of frequency resources, such as frequency resources for one or more guard bands (e.g., to reduce interference between uplink and downlink frequency resources). In some examples, SBFD communications may provide increased coverage, reduced latency, and reduced interference (e.g., self-interference, clutter echo, or interference between devices), for instance, as compared to IBFD or half-duplex communications.

The base station 105 may configure the UE 115 with one or more TTIs according to a full-duplex configuration, a half-duplex configuration, or some combination thereof. For instance, the base station 105 may transmit a configuration to the UE 115 for a set of TTIs that includes at least one full-duplex TTI. Additionally, the base station 105 may transmit control signaling (e.g., DCI) to the UE 115 that indicates resource allocations (e.g., FDRAs, TDRAs) for transmissions in the set of TTIs. For instance, the UE 115 may receive control signaling indicating an FDRA and a TDRA for a physical uplink channel transmission in a first TTI of the set of TTIs. In some examples, the UE 115 may be configured to transmit one or more repetitions of the physical uplink channel transmission, for instance, to increase reliability of the physical uplink channel transmission.

The UE 115 may determine whether a TTI is available for a repetition by comparing a resource allocation, such as indicated by an FDRA field corresponding to the physical uplink channel transmission, to a resource allocation of the TTI. For instance, the UE 115 may determine that a second, full-duplex TTI is available if the FDRA of the physical uplink channel transmission indicates one or more resources that are non-overlapping with resources of the second TTI that are allocated for non-uplink transmissions (e.g., downlink transmissions). The UE 115 may transmit (e.g., to the base station 105) one or more repetitions of the physical uplink channel transmission in at least the first TTI and the second TTI (e.g., and any additional TTIs determined by the UE 115 to be available).

In some examples, the UE 115 may transmit a partial repetition in the second TTI, for instance, if the FDRA indicates resources that partially overlap with non-uplink resources of the second TTI. For instance, the UE 115 may transmit a portion of the repetition using frequency domain resources in the second TTI that correspond to the non-overlapping resources of the FDRA. In this example, the UE 115 may exclude (e.g., refrain from transmitting) portions of the repetition that would map to the non-uplink resources of the second TTI. In another example, a number of PRBs associated with the FDRA of the physical uplink channel transmission may be different than a number of PRBs available for repetition in the second TTI. Here, the UE 115 may transmit a first portion of the repetition in the second TTI (e.g., based on the number of available PRBs in the second TTI) and a second portion (e.g., the remaining portion) of the repetition in a third TTI. That is, the UE 115 may transmit the repetition in multiple subsequent TTIs, for instance, if a single TTI does not have enough available PRBs.

Figure 2:
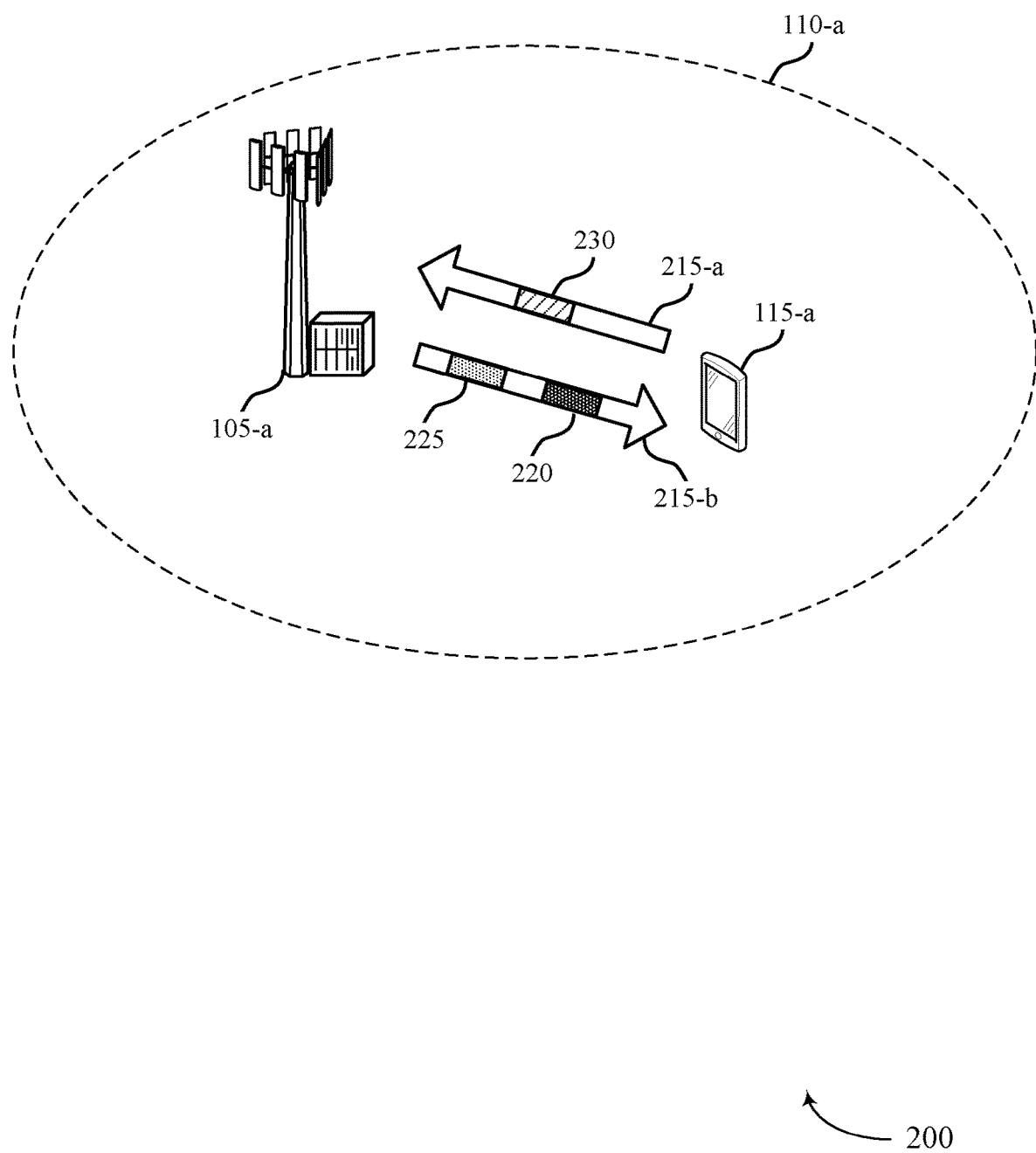

FIG. 2 illustrates an example of a wireless communications system 200 that supports physical uplink channel repetition for full-duplex communications in accordance with aspects of the present disclosure. In some examples, wireless communications system 200 may implement aspects of wireless communications system 100 and may include a UE 115-a and a base station 105-a with a coverage area 110-a, which may be examples of a UE 115 and a base station 105 with a coverage area 110 as described with reference to FIG. 1. The base station 105-a and the UE 115-a may communicate with one another via a communication link 215-a and a communication link 215-b. For example, the communication link 215-a may be an example of an uplink communication link and the communication link 215-b may be an example of a downlink communication link.

The base station 105-a and the UE 115-a may communicate with one another according to a full-duplex configuration. For example, the base station 105-a may transmit a downlink signal (e.g., via the communication link 215-b) to the UE 115-a while receiving (e.g., via the communication link 215-a) an uplink signal from the UE 115-a. Additionally, or alternatively, the UE 115-a may receive (e.g., via the communication link 215-b) the downlink signal from the base station 105-a while transmitting (e.g., via the communication link 215-a) the uplink signal to the base station 105-a.

In some examples, the UE 115-a and the base station 105-a may communicate using IBFD (e.g., as described with reference to FIG. 1) in which the time and frequency resources for an uplink message and a downlink message may fully or partially overlap. For example, the UE 115-a and the base station 105-a may transmit and receive messages over the communication links 215 with the same time and frequency resources. In some other examples, the UE 115-a and the base station 105-a may operate using SBFD (e.g., as described with reference to FIG. 1), in which the UE 115-a and the base station 105-a may transmit and receive messages in a same time resource, but different frequency resources. Thus, the downlink resources may be separated from the uplink resource in the frequency domain, e.g., as described in more detail with reference to FIG. 3.

The base station 105-a may transmit control information, data, or both, to the UE 115-a via the communication link 215-b. The communication link 215-b may be an example of a link used to carry a physical downlink control channel (PDCCH) (e.g., used to transmit control information) or a physical downlink shared channel (PDSCH) (e.g., used to transmit data). For example, the base station 105-a may transmit control signaling 220 to the UE 115-a to communicate scheduling information, resource allocation information, communications parameters, or the like, among other examples. The base station 105-a may additionally transmit a configuration 225 to the UE 115-a via the communication link 215-b.

Likewise, the communication link 215-a may be an example of a link used to carry PUSCH or a PUCCH, such that the UE 115-a may transmit control information, data, or both, to the base station 105-a. For instance, the UE 115-a may transmit a physical uplink channel transmission 230 to the base station 105-a via the communication link 215-a. The physical uplink channel transmission 230 may be transmitted based on the control signaling 220, the configuration 225, or both. For example, the UE 115-a may receive the configuration 225 that configures multiple TTIs, which may include at least one TTI configured for full-duplex communications. The UE 115-a may receive the control signaling 220 that indicates an FDRA, a TDRA, or both, for the physical uplink channel transmission 230. The UE 115-a may transmit the physical uplink channel transmission 230 based on the FDRA and/or the TDRA in a configured TTI.

In some cases, the UE 115-a may transmit repetitions of the physical uplink channel transmission 230 to add redundancy to the transmission in case of transmission failure. The UE 115-a may determine TTIs in which to transmit one or more repetitions according to a set of rules. For example, if the physical uplink channel transmission 230 is an example of a PUCCH transmission, the UE 115-a may transmit repetitions according to a PUCCH repetition procedure, in which the UE 115-a is configured with a number of slots $N_{PUCCH}^{repeat}$ for repetitions of the PUCCH transmission. The UE 115-a may repeat the PUCCH transmission over the number of slots $N_{PUCCH}^{repeat}$, where each slot includes a repetition of the PUCCH transmission. In this example, each repetition of the PUCCH transmission includes a same number of consecutive symbols and has a same first symbol. Thus, the UE 115-a may determine whether a slot is available for a repetition based on whether the slot supports the number of consecutive symbols and the first symbol of the repetition. Put another way, the UE 115-a may determine that a slot is available if the slot has a same TDRA and a same FDRA as the repetition. The UE 115-a may count available slots, up to $N_{PUCCH}^{repeat}$ slots.

The UE 115-a may transmit the repetitions in $N_{PUCCH}^{repeat}$ slots. In some examples, the UE 115-a may transmit fewer than $N_{PUCCH}^{repeat}$ transmissions. For instance, the UE 115-a may determine that a repetition of the PUCCH transmission may overlap with another PUCCH transmission in a slot. The UE 115-a may refrain from transmitting the repetition in the slot, but may still count the slot toward the total number of $N_{PUCCH}^{repeat}$ slots.

If the physical uplink channel transmission 230 is an example of a PUSCH transmission, the UE 115-a may transmit repetitions according to a PUSCH repetition procedure (e.g., PUSCH repetition type A, PUSCH repetition type B). Here, the UE 115-a may transmit repetitions with a same symbol allocation and/or a same starting symbol, e.g., with a same TDRA and a same FDRA. In some examples, the UE 115-a may transmit repetitions of the PUSCH transmission within a same slot, while in other examples, the UE 115-a may transmit repetitions in consecutive available slots (e.g., across slot boundaries). Similar to the PUCCH repetition procedure, the UE 115-a may be configured with a number of repetitions and may count the repetitions based on available slots.

In some examples, the UE 115-*a* may determine whether TTIs (e.g., slots) are available for transmitting one or more repetitions of a physical uplink channel transmission 230 based on a set of rules or criteria. However, in some cases, these rules may include restrictions that exclude full-duplex TTIs. For instance, some techniques may exclude resources for repetitions of the physical uplink channel transmission 230 when at least one symbol period in a slot (e.g., indicated by a TDRA) at least partially overlaps with one or more other symbol periods in the same slot not intended for uplink transmissions. In such cases, the UE may determine that a TTI is unavailable with respect to the set of rules, even if the TTI is otherwise available, such as when TTI includes resources supporting concurrent uplink and downlink transmissions. In particular, because full-duplex TTIs may include symbol periods for uplink transmissions that overlap with one or more symbols for downlink transmissions or other non-uplink transmissions, the UE 115-*a* may be unable use the full-duplex TTIs for repetitions of the physical uplink channel transmission 230, despite the TTI having some uplink resources that are non-overlapping with downlink resources in the frequency domain. Such rules may result in inefficiencies in the wireless communications system 200, such as increased latency, wasted resources, and decreased throughput, among other issues.

As described herein, however, the wireless communications system 200 may support the use of techniques that enable the UE 115-*a* to use a slot (e.g., a TTI) for transmitting one or more repetitions of the physical uplink channel transmission 230 when the slot is configured for full-duplex communications. In particular, when determining what resources may be used for one or more repetitions of a physical uplink channel transmission, a TTI (e.g., a slot) may be determined to be unavailable for a physical uplink channel repetition transmission in a frequency hop if at least one of the symbols indicated by time domain resource allocation for a physical uplink channel in the slot overlaps with the symbol not intended for uplink transmissions and at least one of the PRBs indicated by frequency domain resource allocation for a physical uplink channel in the slot overlaps with at least one PRB not intended for uplink transmissions. The UE 115-*a* may accordingly compare resources allocated by the FDRA and/or TDRA indicated in the control signaling 220 to resources allocated to a TTI (e.g., based on the configuration 225) to determine if the TTI is available for a repetition. More specifically, when the TTI is a full-duplex TTI, the UE 115-*a* may compare one or more resources indicated by the FDRA to resources of the TTI that are allocated for transmissions different from an uplink transmission (e.g., downlink resources, guard band resources). If the UE 115-*a* determines that the TTI is available based on the comparison, the UE 115-*a* may transmit a repetition in the TTI. In some cases, the UE 115-*a* may be configured with a number of repetitions such that the UE 115-*a* may determine availability for as many TTIs as the configured number of repetitions. In such cases, with added criteria for determining whether a slot is unavailable (e.g., resources for the physical uplink channel transmission 230 may overlap with non-uplink resources in the time domain but may not overlap with resources the frequency domain), one or more full-duplex slots may be identified as being available for repetitions of the physical uplink channel transmission 230, thereby enhancing efficiency in wireless communications system 200.

In some examples, the UE 115-*a* may determine (e.g., based on the comparison) that a TTI is unavailable if one or more PRBs indicated by the FDRA at least partially overlap with non-uplink resources of the TTI in the frequency domain. Put another way, the UE 115-*a* may determine that the TTI is available if the one or more PRBs are non-overlapping (e.g., in the frequency domain) with downlink resources of the TTI; that is, the TTI is available if the resources indicated by the FDRA of the physical uplink channel transmission 230 maps to uplink resources of the TTI.

In some examples, the UE 115-*a* may be configured with an FDRA (e.g., a second FDRA) for full-duplex TTIs, such that the UE 115-*a* may transmit repetitions of the physical uplink channel transmission 230 according to the second FDRA. For instance, the control signaling 220 may include an indication of the FDRA and an indication of the second FDRA. Additionally or alternatively, the control signaling 220 may indicate the FDRA and the UE 115-*a* may calculate uplink resources of the second FDRA based on some parameters (e.g., an offset, such as an offset with respect to one or more resources indicated by the FDRA).

The UE 115-*a* may transmit the physical uplink channel transmission 230 and the repetition (e.g., and any additional repetitions) to the base station 105-*a* via the communication link 215-*a*, for instance, based on determining available TTIs. In some examples, the UE 115-*a* may transmit the repetition(s) based on comparing the resource allocation of the physical uplink channel transmission 230 and the TTI. For example, the UE 115-*a* may transmit a partial repetition in the TTI, e.g., by excluding portions of the repetition, or by transmitting different portions in one or more other TTIs (e.g., one or more subsequent TTIs). In some examples, the UE 115-*a* may transmit the repetition(s) based on a frequency hopping pattern. Additionally, or alternatively, the UE 115-*a* may transmit repetitions using a same TDRA in each associated TTI. Such transmission methods for the repetition are described in more detail with reference to FIG. 4.

Figure 3:
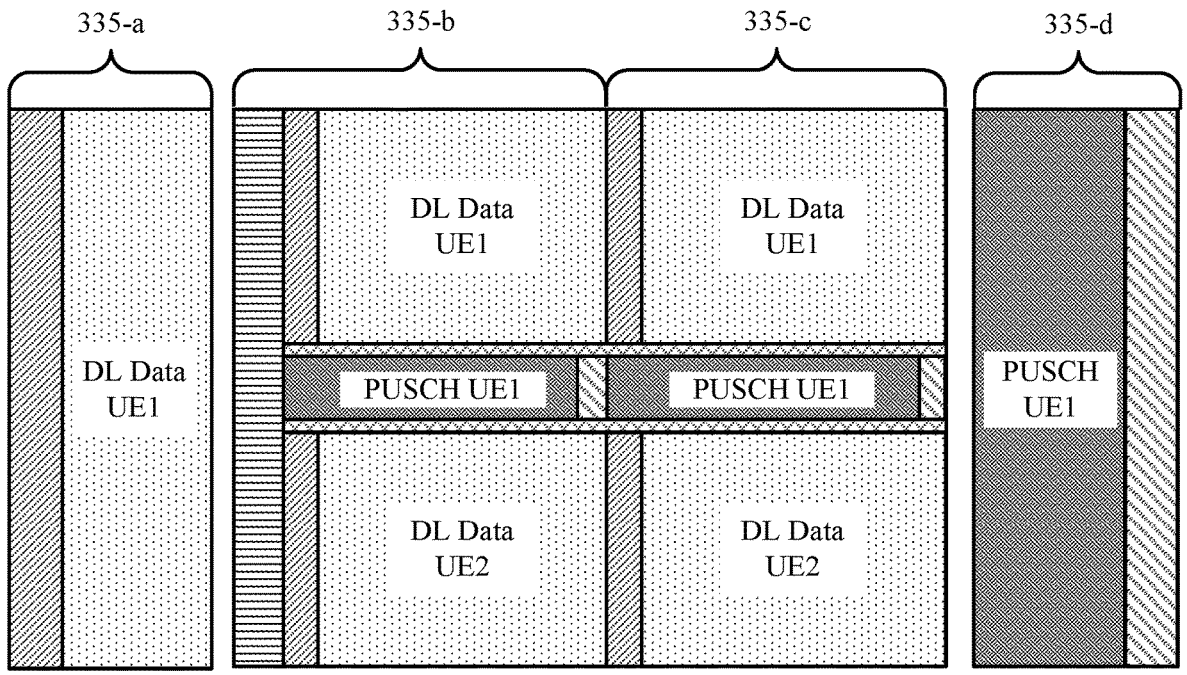
FIG. 3 illustrates an example of a resource configuration that supports physical uplink channel repetition for full-duplex communications in accordance with aspects of the present disclosure.
Figure 3:
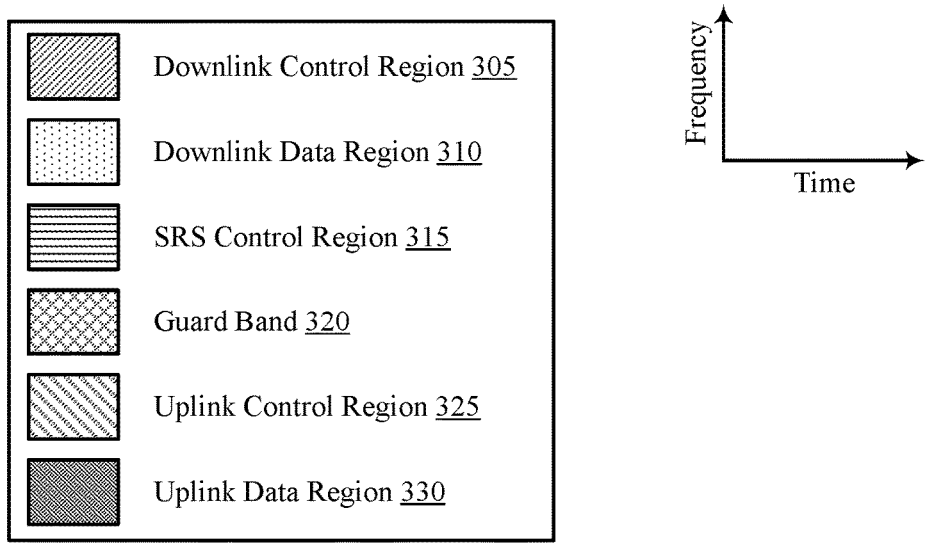

FIG. 3 illustrates an example of a resource configuration 300 that supports physical uplink channel repetition for full-duplex communications in accordance with aspects of the present disclosure. In some examples, resource configuration 300 may implement aspects of wireless communications systems 100 and 200. For example, a UE (e.g., a UE 115 as described with reference to FIG. 1 and FIG. 2) may determine a resource configuration 300 for full-duplex communications with a base station (e.g., a base station 105 as described with reference to FIG. 1 and FIG. 2) or another UE. The resource configuration 300 may represent a set of time and frequency resources for communication between the UE and the base station or other UE. In some examples, the base station may transmit an indication of the resource configuration 300 to the UE.

The resource configuration 300 may include, for example, one or more slots 335. Each slot 335 may include one or more uplink transmissions and one or more downlink transmissions, which may share time-frequency resources. The downlink transmissions may include downlink control regions 305 and downlink data regions 310. Similarly, the uplink transmissions may include uplink control regions 325 and uplink data regions 330. Downlink control region 305 and uplink control region 325 may include, for example, resources allocated in the time domain (e.g., as indicated by a TDRA field) and resources allocated in the frequency domain (e.g., as indicated by a FDRA field), and may be associated with bandwidth part (BWP) information (e.g., BWP location, BWP allocation information), or the like, for each respective downlink data region 310 and uplink data region 330.

Slots 335 may represent a configured time for communication between the UE and the base station, or between the UE and another UE, or both. For example, each slot 335 may be considered a TTI, one or more consecutive symbols (e.g., OFDM symbols), or a different length duration of time. Each slot 335 may include (e.g., may correspond to) a respective resource allocation in the frequency domain. For instance, a slot 335 may include a number of subcarriers, a number of resource blocks (e.g., PRBs), and the like. In some examples, one or more slots 335 may be associated with a frequency hopping pattern (e.g., inter-slot frequency hopping, intra-slot frequency hopping); in such examples, transmissions may change carrier frequencies within a slot 335 or across slots 335.

Each slot 335 may be configured according to a communication type. For example, slots 335-a and 335-d may be configured for half-duplex communications (e.g., communications in either the uplink direction or the downlink direction in a given time), where slot 335-a may include a downlink control region 305 and a downlink data transmission (e.g., a PDSCH transmission) in downlink data region 310, and slot 335-d may include an uplink control region 325 and an uplink data transmission (e.g., a PUSCH transmission) in uplink data region 330.

Slots 335-b and 335-c may be configured for full-duplex communications (e.g., supporting simultaneous communications in both uplink and downlink directions in a given time). For example, slot 335-b may include downlink control regions 305, corresponding downlink data regions 310, uplink control regions 325, and corresponding uplink data regions 330, which may share the same time-frequency resources. Slot 335-b may also include a guard band 320, which may be located between downlink and uplink regions (e.g., to reduce interference between downlink and uplink transmissions).

The downlink data regions 310 and uplink data regions 330 in a full-duplex slot 335-b may include one or more resource allocations (e.g., FDRAs, TDRAs) for a corresponding transmission (e.g., an uplink data region 330 may include a resource allocation for an uplink transmission, a downlink data region 310 may include a resource allocation for a downlink transmission). In some examples, slot 335-b may also include a sounding reference signal (SRS) region 315.

A full-duplex slot (e.g., slot 335-b, slot 335-c) may, in some cases, include data regions for one or more UEs. For example, slot 335-b may include a first band configured for downlink communications for a first UE, and a second band configured for downlink communications for a second UE. In some cases, slot 335-b may have multiple bands configured for downlink communications for the same UE (e.g., the first UE).

The slots 335 may include or be an example of multiple TTIs configured by the base station for communications with the UE. For instance, the base station may transmit a configuration for the slots 335 to the UE, where the slots 335 include at least one full-duplex slot (e.g., slot 335-b). The UE may be configured to transmit one or more repetitions of the physical uplink channel transmission in the slots 335, where the UE determines whether a slot 335 is available for a repetition in accordance with the techniques described herein. For instance, the UE may compare resources indicated by an FDRA for the physical uplink channel transmission with the resource allocation of each slot 335. As illustrated, slot 335-a may be configured for downlink transmissions, and the UE may determine that the FDRA of the physical uplink channel transmission overlaps with the downlink resources allocated to slot 335-a, and may determine that slot 335-a is unavailable for transmission of a repetition of the physical uplink channel. In slot 335-b, if the resources indicated by the FDRA map to (e.g., are within) the uplink data region 330, the UE may determine that slot 335-b is available and may transmit a repetition in slot 335-b (e.g., in the uplink data region 330). If the FDRA indicates resources that overlap (e.g., in the frequency domain) with the resources allocated to the downlink data region 310 within the same slot 335-b, the UE may adjust one or more communications parameters to avoid overlapping the repetition with non-uplink resources (e.g., allocated to a guard band 320 or a downlink data region 310). Additionally, or alternatively, the UE may refrain from transmitting a repetition in slot 335-b. In slot 335-c, the UE may determine that the FDRA indicates resources that map to (e.g., are within) the resource allocation for the uplink data region 330, and may transmit a repetition of the physical uplink channel in the uplink data region 330.

Figure 4A:
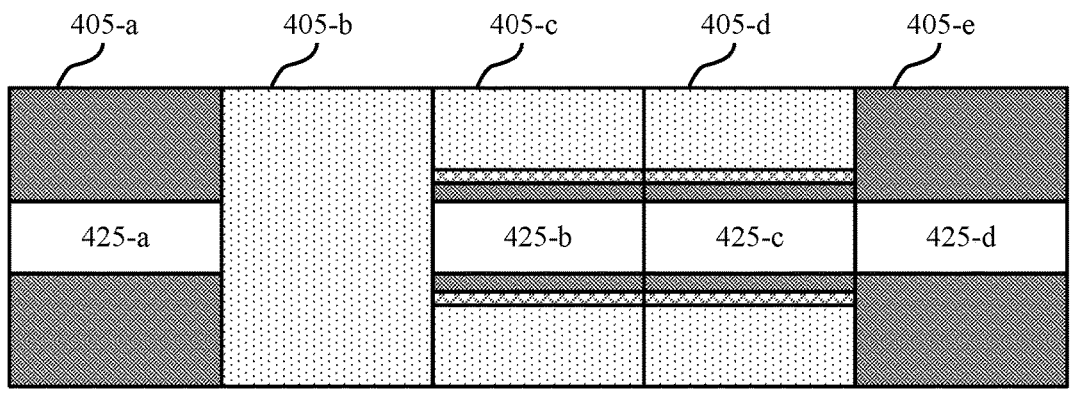
FIGS. 4A, 4B, and 4C illustrate examples of resource configurations that support physical uplink channel repetition for full-duplex communications in accordance with aspects of the present disclosure.
Figure 4B:
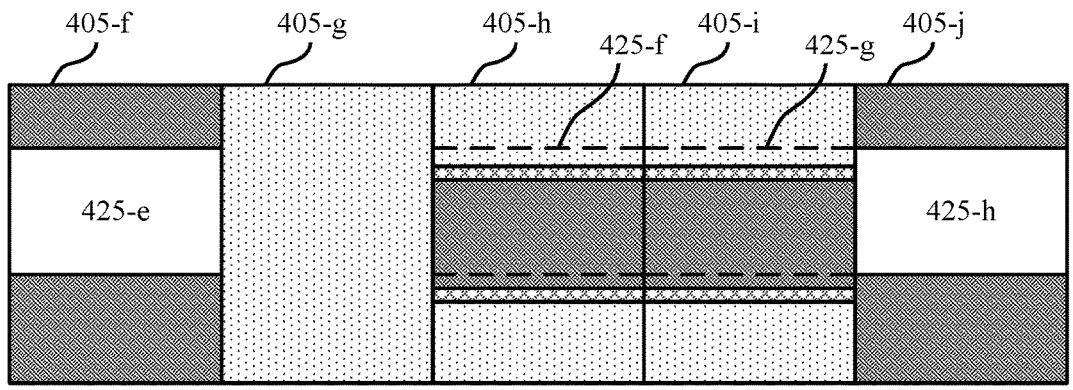
Figure 4C:
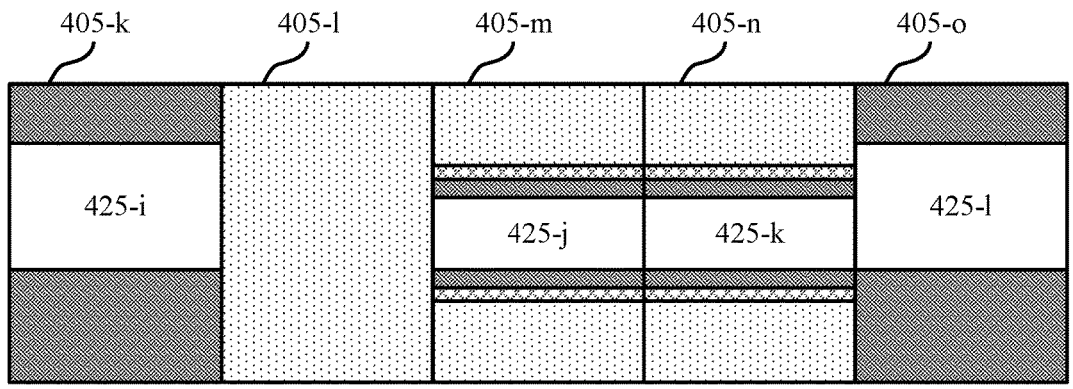

FIGS. 4A, 4B, and 4C illustrate examples of resource configurations 401, 402, and 403, respectively, that support physical uplink channel repetition for full-duplex communications in accordance with aspects of the present disclosure. In some examples, resource configurations 401, 402, and 403 may implement aspects of wireless communications systems 100 and 200. For example, a UE (e.g., a UE 115 as described with reference to FIG. 1 and FIG. 2) may determine a resource configuration 401, 402, or 403 for full-duplex communications with a base station (e.g., a base station 105 as described with reference to FIG. 1 and FIG. 2). The resource configurations 401, 402, and 403 may each represent a set of time and frequency resources for communication between the UE and the base station.

FIGS. 4A, 4B, and 4C illustrate various methods of transmitting a physical uplink channel transmission and one or more corresponding repetitions in a resource configuration 401, 402, or 403 that includes TTIs configured for both half-duplex communications and full-duplex communications. For example, the resource configurations 401, 402, and 403 each include TTIs 405, where each TTI 405 is configured for one or both of uplink transmissions and downlink transmissions. A TTI 405 configured for uplink transmissions includes an uplink data region 410, while a TTI 405 configured for downlink transmissions includes a downlink data region 415. A TTI 405 configured for simultaneous uplink and downlink transmissions in the TTI 405 may be referred to as a full-duplex TTI and may include both an uplink data region 410 and a downlink data region 415. In some examples, a full-duplex TTI may include a guard band 420 separating an uplink data region 410 and a downlink data region 415, for instance, to reduce interference between the uplink data region 410 and the downlink data region 415.

A base station may transmit, to a UE, an indication of a configuration for the TTIs 405, e.g., whether each TTI 405 of a resource configuration 401, 402, or 403 is configured for uplink transmissions, downlink transmissions, or both. Additionally, the base station may transmit control signaling (e.g., scheduling information) to the UE indicating resource allocations (e.g., FDRAs, TDRAs) for transmissions in respective TTIs 405. For instance, the UE may receive control signaling indicating an FDRA for an uplink transmission 425 (e.g., a physical uplink channel transmission). In some cases, the UE may be configured to transmit one or more repetitions of the uplink transmission 425 in one or more TTIs 405. The UE may determine whether each TTI 405 of a resource configuration 401, 402, or 403 is available for transmitting a repetition. If a TTI 405 is available, the UE may transmit a repetition in the TTI 405. In some examples, the UE may transmit multiple repetitions in a TTI 405. In some cases, the UE may transmit repetitions in respective TTIs 405 using a same TDRA for the TTIs 405.

For example, in FIG. 4A, the UE may receive control signaling indicating an FDRA and a TDRA for an uplink transmission 425-a, e.g., in the TTI 405-a. The UE may determine that the TTI 405-b is unavailable for a repetition of the uplink transmission 425-a as the TTI 405-b may be configured for downlink transmissions (e.g., includes only downlink resources). The UE may compare the FDRA and the TDRA for the uplink transmission 425-a with the resource allocation of TTI 405-c (e.g., based on the format or configuration of TTI 405-c). For instance, a resource allocation may include a set of time resources, such as one or more symbols, and a set of frequency resources, such as one or more subcarriers. In some examples, a resource allocation may include one or more resource blocks (e.g., PRBs) that each include multiple subcarriers. The resource allocation may be for communications in a specified direction, e.g., uplink or downlink. TTI 405-c, as illustrated, may include downlink resources allocated to multiple (e.g., two) downlink data regions 415, resources allocated to two guard bands 420, and uplink resources allocated to an uplink data region 410.

The UE may compare resources indicated by the FDRA and the TDRA of the uplink transmission 425-a with the resource allocations of TTI 405-c configured for transmissions other than uplink transmissions. More specifically, the UE may determine whether any PRBs indicated in the FDRA overlap with any PRBs of the downlink data region 415 and/or the guard band 420. That is, because the UE may transmit a repetition of an uplink transmission 425 only on uplink resources, the UE may determine if the FDRA for the uplink transmission 425 maps to the uplink resources of a TTI 405. If the FDRA maps to resources other than uplink resources (e.g., guard band resources, downlink resources) and the UE attempts to transmit a repetition in the TTI 405, some portions of the repetition may be transmitted on non-uplink resources and may not be successfully received by the base station.

Accordingly, if the FDRA indicates resources that partially or fully overlaps with non-uplink resources in a TTI 405 in the frequency domain, the UE may determine that the TTI 405 is unavailable for a repetition. Alternatively, if one or more PRBs indicated by the FDRA are non-overlapping with PRBs allocated for downlink transmissions in the TTI 405, the UE may determine that the TTI 405 is available.

In some examples, the UE may compare the FDRA of the uplink transmission 425-a with the resource allocation of TTI 405-c based on an FDRA associated with the TTI 405-c. For example, the FDRA of the uplink transmission 425-a may be an example of a first FDRA that is for non-full-duplex TTIs 405 (e.g., TTI 405-a, TTI 405-b), and the UE may determine a second FDRA that is for full-duplex TTIs 405 (e.g., TTI 405-c, TTI 405-d). The second FDRA may be explicitly indicated to the UE, for instance, as part of control signaling (such as control signaling 220 described with reference to FIG. 2); the first FDRA and the second FDRA may be indicated as separate FDRA fields in an uplink grant transmitted in the control signaling. Alternatively, the UE may identify the second FDRA based on an offset from the first FDRA. For instance, the UE may receive an indication of the first FDRA and may calculate uplink resources for the second FDRA based on a frequency offset (e.g., a predetermined or preconfigured frequency offset) with respect to one or more resources indicated by the first FDRA. In other examples, the UE may receive an indication of the frequency offset, as part of the control signaling or other signaling. In some cases, the second FDRA may indicate uplink resources of the associated TTI 405 that are non-overlapping with non-uplink resources of the TTI 405.

As illustrated, the FDRA of the uplink transmission 425-a may indicate resources that are non-overlapping with the downlink resources and the guard band resources of TTI 405-c, such that the UE may determine that the TTI 405-c is available. The UE may transmit at least one repetition 425-b of the uplink transmission 425-a in the uplink data region 410 of TTI 405-c. The UE may perform equivalent, respective comparisons between the FDRA of the uplink transmission 425-a and resources allocated for transmissions different from an uplink transmission in TTI 405-d and in TTI 405-e. In the example of FIG. 4A, the UE may determine that TTI 405-d and TTI 405-e are available, and may transmit respective repetitions 425-c and 425-d in the corresponding uplink data regions 410 of the TTIs 405.

In FIG. 4B, the UE may receive an FDRA and a TDRA for the uplink transmission 425-e in TTI 405-g. The UE may refrain from transmitting a repetition in TTI 405-g, which may be configured for downlink transmissions, and may transmit a repetition 425-h in TTI 405-j configured for uplink transmissions.

The resources indicated by the FDRA for the uplink transmission 425-e may be relatively larger (e.g., span a relatively larger number of resources in the frequency domain) as compared to the example of FIG. 4A (e.g., compared to the FDRA for the uplink transmission 425-a), while resource allocations for TTIs 405-h and 405-i may remain substantially the same (e.g., compared to the example of FIG. 4A). For instance, an amount of PRBs indicated in the FDRA for the uplink transmission 425-e may be greater than the amount of PRBs indicated in the FDRA for the uplink transmission 425-a. In this example, when the UE compares the resources indicated by the FDRA for the uplink transmission 425-e with the resources allocated in TTI 405-h, the UE may determine that one or more PRBs indicated in the FDRA overlap with PRBs allocated for the downlink data region 415 and/or the guard band 420. As a result, TTI 405-h and TTI 405-i may be unavailable for repetitions (e.g., a repetition 425-f, a repetition 425-g) as portions of each repetitions would be transmitted on downlink resources (e.g., in downlink data regions 415) and guard band resources (e.g., in guard band 420).

In some examples, based on the PRBs overlapping, the UE may determine that TTI 405-h and TTI 405-i are unavailable and may refrain from transmitting the repetitions 425-f and 425-g in the TTIs 405-h and 405-i. In other examples, the UE may modify the repetitions 425-f and 425-g, for instance, to increase the likelihood that the repetitions 425-f and 425-g are received by the base station, and may transmit the repetitions 425-f and 425-g in the TTIs 405-h and 405-i in spite of the overlap.

FIG. 4C illustrates an example in which some resources indicated by an FDRA of an uplink transmission 425-i may overlap with non-uplink resources in a TTI 405 (e.g., TTI 405-m and TTI 405-n). In this example, the UE may transmit repetitions 425-j and 425-k in the TTIs 405 on only non-overlapping resources.

The UE may receive an FDRA and a TDRA for the uplink transmission 425-i in the TTI 405-k. TTI 405-l, configured for only downlink transmissions, may not be available for repetitions. The UE may compare the FDRA (e.g., and TDRA) of the uplink transmission 425-i with the resource allocations of TTI 405-*m*, as described herein, and may determine that at least one PRB indicated by the FDRA at least partially overlaps with resources of the downlink data region 415 and/or the guard bands 420 of TTI 405-*m*.

In some cases, the UE may determine, based on the comparing, that a first number of PRBs available for uplink transmissions in TTI 405-*m* is different from a second number of PRBs indicated by the FDRA, e.g., that the first number of PRBs is less than the second number of PRBs. In some examples, the first number of PRBs may be indicated by a second FDRA, e.g., associated with the TTI 405-*m*. In some cases, the UE may determine to transmit a repetition of the uplink transmission 425-*i* in multiple consecutive TTIs 405 (e.g., TTIs 405-*m* and 405-*n*) based on the first number of PRBs being different from the second number of PRBs. That is, the UE may transmit a first portion of a repetition (e.g., repetition 425-*j*) in TTI 405-*m* and a second portion (e.g., remaining portion) of the repetition (e.g., repetition 425-*k*) in TTI 405-*n*. In this example, a third number of PRBs associated with the first portion and second portion may be the same as the second number of PRBs.

In some other cases, when resources (e.g., frequency resources, such as PRBs) indicated by the FDRA are at least partially overlapping with non-uplink resources of a TTI 405 (e.g., TTI 405-*m*, TTI 405-*n*), the UE may refrain from using the overlapping resources and may only transmit a repetition on non-overlapping resources. For instance, the UE may transmit the repetition 425-*j* using uplink resources of TTI 405-*m* that correspond to a subset of resources indicated by the FDRA, where the subset includes the resources of the FDRA that are non-overlapping with downlink resources or guard band resources of the TTI 405-*m*. In some examples, the UE may perform rate matching to avoid partial transmissions of the repetition 425-*j*.

Alternatively, the UE may transmit the repetition 425-*j* on both overlapping and non-overlapping resources, but may exclude transmitting data on the overlapping resources. For example, the UE may transmit the repetition 425-*j* using frequency resources of the TTI 405-*m* that correspond to the frequency resources indicated by the FDRA. The UE may exclude data in a subset of the frequency resources of the TTI 405-*m*, where the subset of frequency resources overlaps with resources of downlink data regions 415 and/or resources of guard bands 420. Put another way, the UE may map the repetition 425-*j* to the frequency resources indicated by the FDRA (e.g., including overlapping frequency resources) but may refrain from puncturing information in the overlapping frequency resources. Additionally or alternatively, the UE may compare the resources indicated by the FDRA with resources of the uplink data region 410, and may transmit the repetition 425-*j* on only the resources determined to be available for the physical uplink channel transmission (e.g., in the uplink data region 410).

Figure 5:
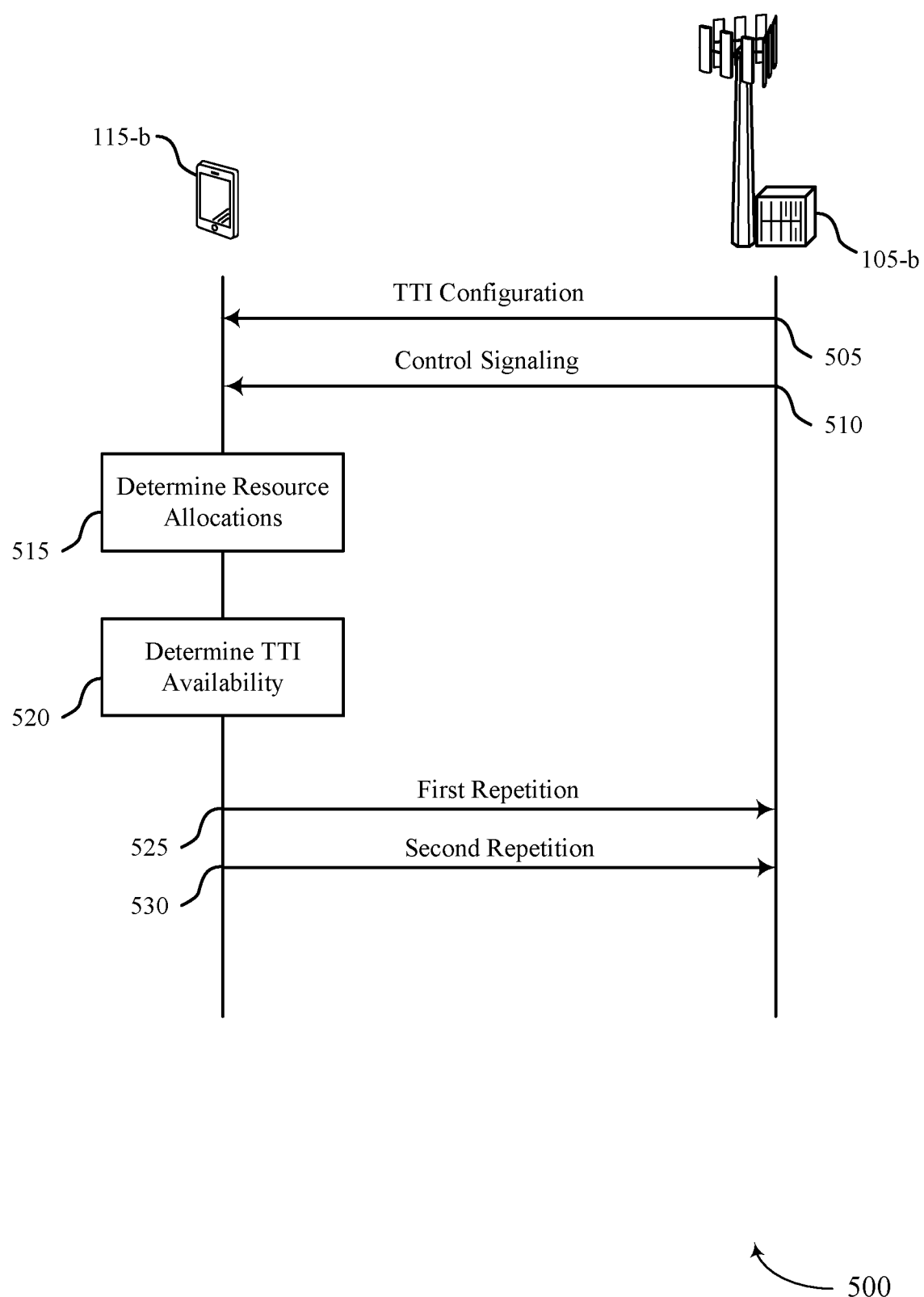
FIG. 5 illustrates an example of a process flow in a system that supports physical uplink channel repetition for full-duplex communications in accordance with aspects of the present disclosure.

FIG. 5 illustrates an example of a process flow 500 in a system that supports physical uplink channel repetition for full-duplex communications in accordance with aspects of the present disclosure. In some examples, process flow 500 may implement aspects of wireless communications systems 100 and 200. For example, process flow 500 may include a UE 115-*b* and a base station 105-*b*, which may be examples of corresponding devices described herein.

In the following description of the process flow 500, the operations between the UE 115-*b* and the base station 105-*b* may be transmitted in a different order than the order shown, or the operations performed by the UE 115-*b* and the base station 105-*b* may be performed in different orders or at different times. Some operations may also be left out of the process flow 500, or other operations may be added to the process flow 500. It is to be understood that while the UE 115-*b* and the base station 105-*b* are shown performing a number of the operations of process flow 500, any wireless device may perform the operations shown.

At 505, the base station 105-*b* may transmit, and the UE 115-*b* may receive, a configuration for a set of TTIs including at least one TTI for full-duplex communications, which may be referred to as a full-duplex TTI.

At 510, the base station 105-*b* may transmit, and the UE 115-*b* may receive, control signaling indicating resource allocation information and/or scheduling information to the UE 115-*b*. For example, the base station 105-*b* may transmit downlink control information (DCI) to the UE 115-*b*. The DCI may include resource allocation information (e.g., a TDRA, an FDRA, or both) for transmitting a physical uplink channel in a first TTI of the set of TTIs.

At 515, the UE 115-*b* may determine resource allocations, for instance, based on the configuration at 505 and the control signaling at 510. For example, the UE 115-*b* may determine a first FDRA for transmitting the physical uplink channel in the first TTI and resource allocations for one or more TTIs of the set of TTIs, e.g., including a second TTI, where the second TTI is for full-duplex communications. The second TTI may include resources allocated for uplink transmissions, resources allocated for downlink transmissions, and other resources (e.g., guard band resources).

In some examples, at 515, the UE 115-*b* may determine a second FDRA for transmitting the physical uplink channel in the second TTI, e.g., based on the first FDRA. The UE 115-*b* may receive (e.g., via the control signaling at 510) an indication of the second FDRA and may determine the second FDRA based on the indication, or may calculate or otherwise determine uplink resources of the second FDRA based on a frequency offset with respect to one or more frequency resources indicated by the first FDRA. For instance, the UE 115-*b* may receive a message indicating the frequency offset or may identify a predetermined or preconfigured frequency offset. In some cases, the second FDRA may indicate uplink resources that are non-overlapping (e.g., in the frequency domain) with the resources of the second TTI that are allocated for transmissions different from an uplink transmission (e.g., downlink resources, guard band resources).

The UE 115-*b* may compare the FDRA (e.g., and the TDRA) to the resource allocation(s) for the one or more TTIs including the second TTI. For example, the UE 115-*b* may compare the FDRA to resources of the second TTI that are allocated for transmissions different from an uplink transmission.

At 520, the UE 115-*b* may determine that the second TTI is available, for instance, based on the comparison associated with determining the resource allocations at 515. For example, at 520, the UE 115-*b* may determine that one or more PRBs indicated by the FDRA are non-overlapping in a frequency domain with downlink resources of the second TTI.

In some examples, the UE 115-*b* may determine that the second TTI is available by determining that a first number of PRBs of the second TTI are available for transmission of the physical uplink channel based on the second TTI being configured for full-duplex communications. In such examples, the first TTI may be configured for communications other than full-duplex communications (e.g., half-duplex communications). The first number of PRBs may be different from a second number of PRBs of the first TTI.

At 525, the UE **115-*b* may transmit, and the base station 105-*b* may receive, one or more first repetitions of the physical uplink channel over the first TTI. In some examples, the UE 115-*b***

At 530, the UE **115-*b* may transmit, and the base station 105-*b* may receive, one or more second repetitions of the physical uplink channel over the second TTI based on determining that the second TTI is available, e.g., at 520. For instance, the UE 115-*b*** may transmit at least one repetition of the physical uplink channel in the second TTI based on the second FDRA, the message indicating the frequency offset, the predetermined frequency offset, or some combination thereof.

In some cases, the UE **115-*b* may transmit, and the base station 105-*b* may receive, the one or more first repetitions at 525 and the one or more second repetitions at 530 based on determining that one or more resources indicated by the first FDRA are at least partially overlapping with non-uplink resources of the second TTI. In such cases, the UE 115-*b* may transmit a repetition of the one or more first repetitions using a first set of frequency domain resources associated with the first TTI (e.g., based on the first FDRA) and a repetition of the one or more second repetitions using a second set of frequency domain resources associated with the second TTI; here, the second set of frequency domain resources may correspond to the first set of frequency domain resources. In some examples, the UE 115-*b*** may exclude data from a subset of the second set of frequency domain resources, for instance, based on the subset overlapping with resources of the second TTI allocated for non-uplink transmissions. In other examples, the second set of frequency domain resources may correspond to a subset of the first set of frequency domain resources, where the subset of the first set of frequency domain resources are non-overlapping (e.g., in the frequency domain) with non-uplink resources of the second TTI.

In some implementations, the UE **115-*b* may transmit, and the base station 105-*b* may receive, the one or more first repetitions at 525 and the one or more second repetitions at 530 in accordance with a frequency hopping pattern. In some examples, the UE 115-*b* may transmit, and the base station 105-*b*** may receive, a repetition of the one or more first repetitions using a first TDRA of the first TTI, and a repetition of the one or more second repetitions using a second TDRA of the second TTI. In such examples, the first TDRA and the second TDRA may be the same.

Figure 6:
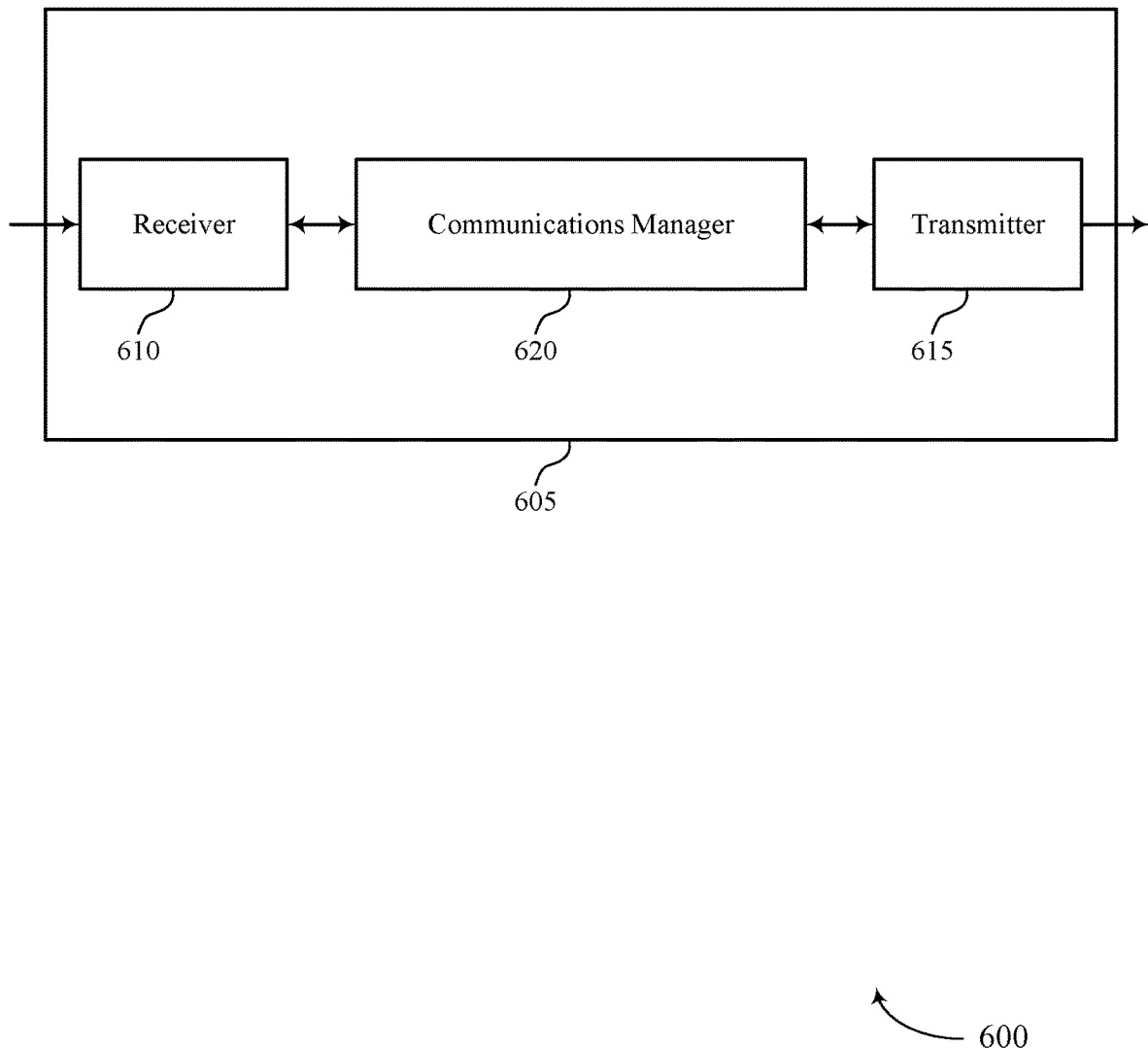
FIGS. 6 and 7 show block diagrams of devices that support physical uplink channel repetition for full-duplex communications in accordance with aspects of the present disclosure.

FIG. 6 shows a block diagram 600 of a device 605 that supports physical uplink channel repetition for full-duplex communications in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to physical uplink channel repetition for full-duplex communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to physical uplink channel repetition for full-duplex communications). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of physical uplink channel repetition for full-duplex communications as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. For example, the communications manager 620 may be configured as or otherwise support a means for receiving a configuration for a set of multiple TTIs that include at least one TTI for full-duplex communications. The communications manager 620 may be configured as or otherwise support a means for receiving control signaling indicating a first FDRA for transmitting a physical uplink channel in a first TTI of the set of multiple TTIs. The communications manager 620 may be configured as or otherwise support a means for determining that a second TTI of the set of multiple TTIs is available for a transmission of the physical uplink channel based on a comparison between the first FDRA and resources of the second TTI that are allocated for transmissions different from an uplink transmission, the second TTI being configured for the full-duplex communications. The communications manager 620 may be configured as or otherwise support a means for transmitting one or more repetitions of the physical uplink channel over at least the first TTI and the second TTI based on the determination that the second TTI is available.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for physical uplink channel transmission repetitions in full-duplex communications. Enabling a device 605 to consider TTIs configured (e.g., formatted) for full-duplex communications as candidates for transmitting repetitions may increase communications efficiency at the device 605. For instance, the device 605 may select from a relatively larger pool of candidate TTIs for a repetition, which may reduce latency associated with repetition procedures. In some examples, based on a greater likelihood of successful communications associated with transmitting repetitions, the device 605 may more efficiently power a processor or one or more processing units associated with transmitting and receiving communications, which may enable the device 605 to save power and increase battery life.

Figure 7:
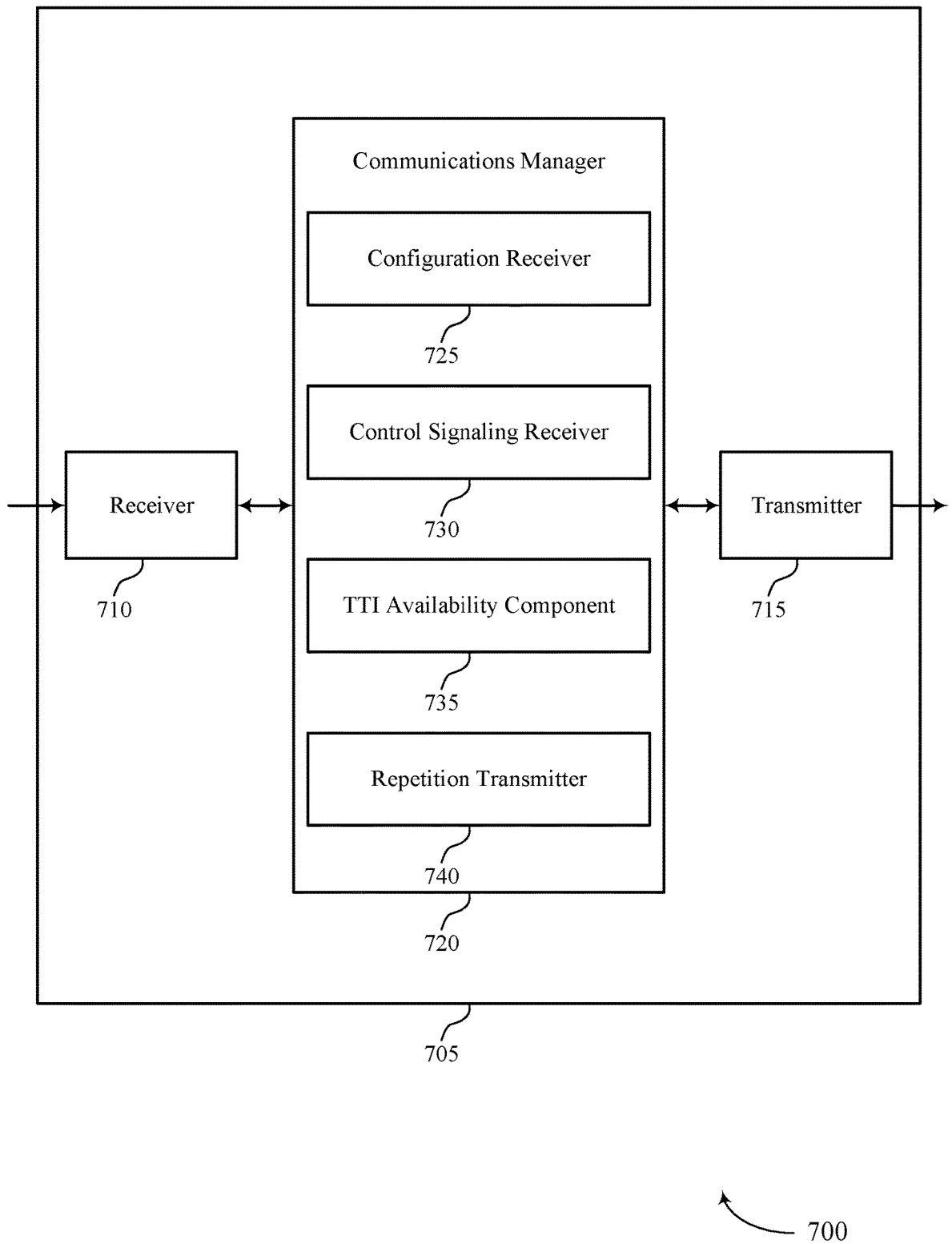

FIG. 7 shows a block diagram 700 of a device 705 that supports physical uplink channel repetition for full-duplex communications in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to physical uplink channel repetition for full-duplex communications). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to physical uplink channel repetition for full-duplex communications). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of physical uplink channel repetition for full-duplex communications as described herein. For example, the communications manager 720 may include a configuration receiver 725, a control signaling receiver 730, a TTI availability component 735, a repetition transmitter 740, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. The configuration receiver 725 may be configured as or otherwise support a means for receiving a configuration for a set of multiple TTIs that include at least one TTI for full-duplex communications. The control signaling receiver 730 may be configured as or otherwise support a means for receiving control signaling indicating a first FDRA for transmitting a physical uplink channel in a first TTI of the set of multiple TTIs. The TTI availability component 735 may be configured as or otherwise support a means for determining that a second TTI of the set of multiple TTIs is available for a transmission of the physical uplink channel based on a comparison between the first FDRA and resources of the second TTI that are allocated for transmissions different from an uplink transmission, the second TTI being configured for the full-duplex communications. The repetition transmitter 740 may be configured as or otherwise support a means for transmitting one or more repetitions of the physical uplink channel over at least the first TTI and the second TTI based on the determination that the second TTI is available.

Figure 8:
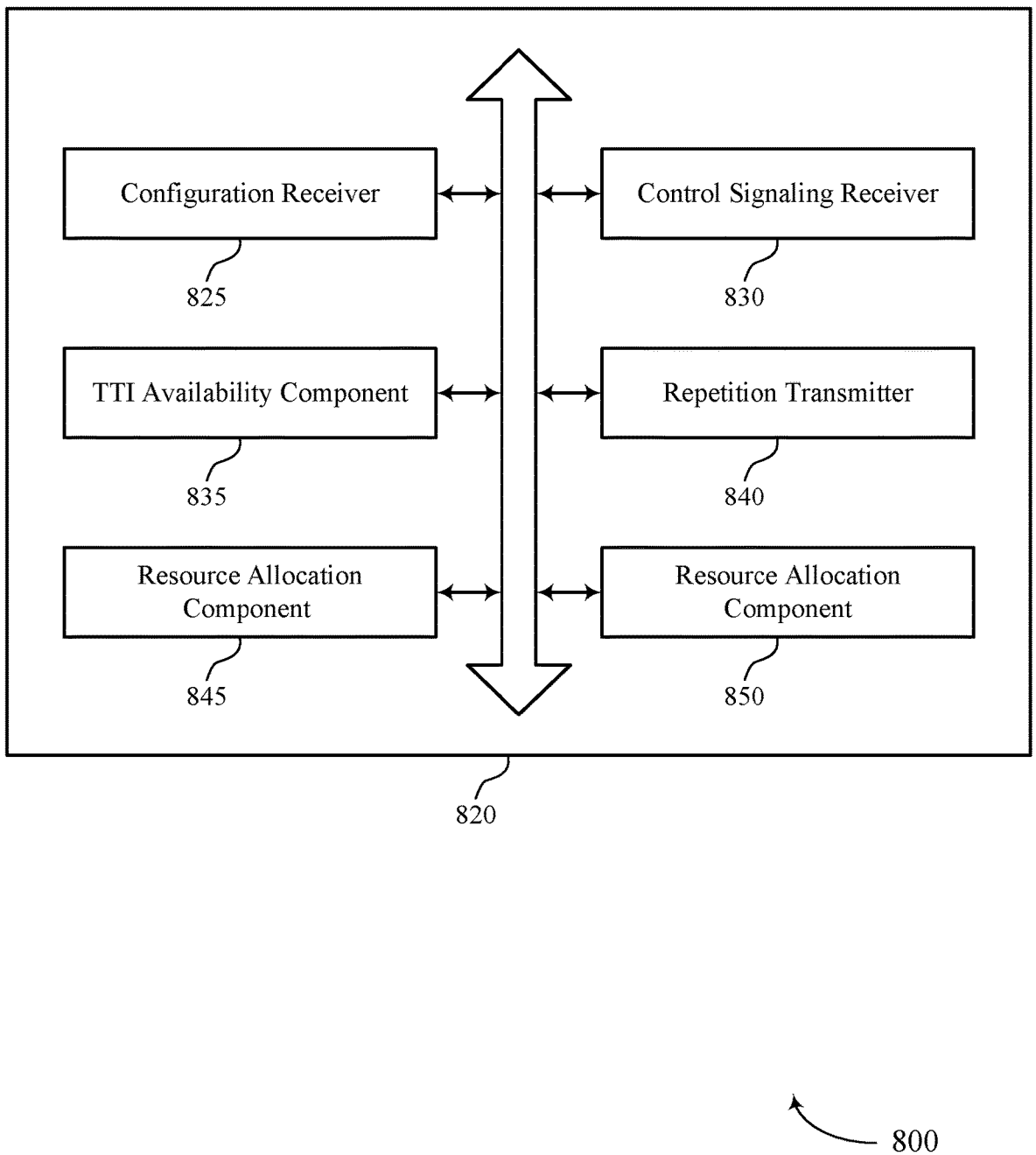
FIG. 8 shows a block diagram of a communications manager that supports physical uplink channel repetition for full-duplex communications in accordance with aspects of the present disclosure.

FIG. 8 shows a block diagram 800 of a communications manager 820 that supports physical uplink channel repetition for full-duplex communications in accordance with aspects of the present disclosure. The communications manager 820 may be an example of aspects of a communications manager 620, a communications manager 720, or both, as described herein. The communications manager 820, or various components thereof, may be an example of means for performing various aspects of physical uplink channel repetition for full-duplex communications as described herein. For example, the communications manager 820 may include a configuration receiver 825, a control signaling receiver 830, a TTI availability component 835, a repetition transmitter 840, a resource allocation component 845, a resource allocation component 850, or any combination thereof. Each of these components may communicate, directly or indirectly, with one another (e.g., via one or more buses).

The communications manager 820 may support wireless communications at a UE in accordance with examples as disclosed herein. The configuration receiver 825 may be configured as or otherwise support a means for receiving a configuration for a set of multiple TTIs that include at least one TTI for full-duplex communications. The control signaling receiver 830 may be configured as or otherwise support a means for receiving control signaling indicating a first FDRA for transmitting a physical uplink channel in a first TTI of the set of multiple TTIs. The TTI availability component 835 may be configured as or otherwise support a means for determining that a second TTI of the set of multiple TTIs is available for a transmission of the physical uplink channel based on a comparison between the first FDRA and resources of the second TTI that are allocated for transmissions different from an uplink transmission, the second TTI being configured for the full-duplex communications. The repetition transmitter 840 may be configured as or otherwise support a means for transmitting one or more repetitions of the physical uplink channel over at least the first TTI and the second TTI based on the determination that the second TTI is available.

In some examples, to support determining that the second TTI is available, the resource allocation component 845 may be configured as or otherwise support a means for determining, based on the comparison, that one or more physical resource blocks indicated by the first FDRA are non-overlapping in a frequency domain with downlink resources of the second TTI, where at least one repetition of the physical uplink channel is transmitted in the second TTI.

In some examples, the resource allocation component 850 may be configured as or otherwise support a means for determining a second FDRA for transmitting the physical uplink channel in the second TTI based on the first FDRA for transmitting the physical uplink channel in the first TTI, where at least one repetition of the one or more repetitions is transmitted in the second TTI based on the second FDRA.

In some examples, the control signaling receiver 830 may be configured as or otherwise support a means for receiving, via the control signaling, an indication of the second FDRA, where determining the second FDRA is based on receiving the indication.

In some examples, the resource allocation component 850 may be configured as or otherwise support a means for calculating uplink resources of the second FDRA based on a frequency offset with respect to one or more resources indicated by the first FDRA.

In some examples, the resource allocation component 850 may be configured as or otherwise support a means for receiving a message indicating the frequency offset, where the at least one repetition of the one or more repetitions is transmitted in the second TTI based on the message indicating the frequency offset. In some examples, the frequency offset includes a predetermined frequency offset. In some examples, the at least one repetition of the one or more repetitions is transmitted in the second TTI based on the predetermined frequency offset. In some examples, the second FDRA indicates uplink resources that are non-overlapping in a frequency domain with the resources of the second TTI that are allocated for the transmissions different from the uplink transmission.

In some examples, to support determining that the second TTI is available, the TTI availability component 835 may be configured as or otherwise support a means for determining that a first number of physical resource blocks of the second TTI are available for the transmission of the physical uplink channel based on the second TTI being configured for the full-duplex communications, where the first number of physical resource blocks is different from a second number of physical resource blocks of the first TTI, the first TTI being configured for communications different from the full-duplex communications.

In some examples, to support transmitting the one or more repetitions of the physical uplink channel, the resource allocation component 850 may be configured as or otherwise support a means for determining that one or more resources indicated by the first FDRA are at least partially overlapping with the resources of the second TTI that are allocated for the transmissions different from the uplink transmission. In some examples, to support transmitting the one or more repetitions of the physical uplink channel, the repetition transmitter 840 may be configured as or otherwise support a means for transmitting a first repetition of the one or more repetitions of the physical uplink channel using first frequency-domain resources of the first TTI based on the first FDRA. In some examples, to support transmitting the one or more repetitions of the physical uplink channel, the repetition transmitter 840 may be configured as or otherwise support a means for transmitting, based on the determination, a second repetition of the one or more repetitions of the physical uplink channel using second frequency-domain resources of the second TTI that correspond to the first frequency-domain resources based on the first FDRA.

In some examples, a subset of the second frequency-domain resources excludes data based on the subset overlapping with the resources of the second TTI that are allocated for the transmissions different from the uplink transmission.

In some examples, to support transmitting the one or more repetitions of the physical uplink channel, the resource allocation component 850 may be configured as or otherwise support a means for determining that one or more resources indicated by the first FDRA are at least partially overlapping in a frequency domain with the resources of the second TTI that are allocated for the transmissions different from the uplink transmission. In some examples, to support transmitting the one or more repetitions of the physical uplink channel, the repetition transmitter 840 may be configured as or otherwise support a means for transmitting a first repetition of the one or more repetitions of the physical uplink channel using first frequency-domain resources of the first TTI based on the first FDRA. In some examples, to support transmitting the one or more repetitions of the physical uplink channel, the repetition transmitter 840 may be configured as or otherwise support a means for transmitting, based on the determination, a second repetition of the one or more repetitions of the physical uplink channel using second frequency-domain resources of the second TTI that correspond to a subset of the first frequency-domain resources based on the subset being non-overlapping in the frequency domain with the resources of the second TTI that are allocated for the transmissions different from the uplink transmission.

In some examples, to support transmitting the one or more repetitions of the physical uplink channel, the repetition transmitter 840 may be configured as or otherwise support a means for transmitting the one or more repetitions of the physical uplink channel over at least the first TTI and the second TTI in accordance with a frequency hopping pattern.

In some examples, to support transmitting the one or more repetitions of the physical uplink channel, the repetition transmitter 840 may be configured as or otherwise support a means for transmitting a first repetition of the one or more repetitions of the physical uplink channel using a first TDRA for the first TTI. In some examples, to support transmitting the one or more repetitions of the physical uplink channel, the repetition transmitter 840 may be configured as or otherwise support a means for transmitting a second repetition of the one or more repetitions of the physical uplink channel using a second TDRA for the second TTI, where the second TDRA is the same as the first TDRA.

Figure 9:
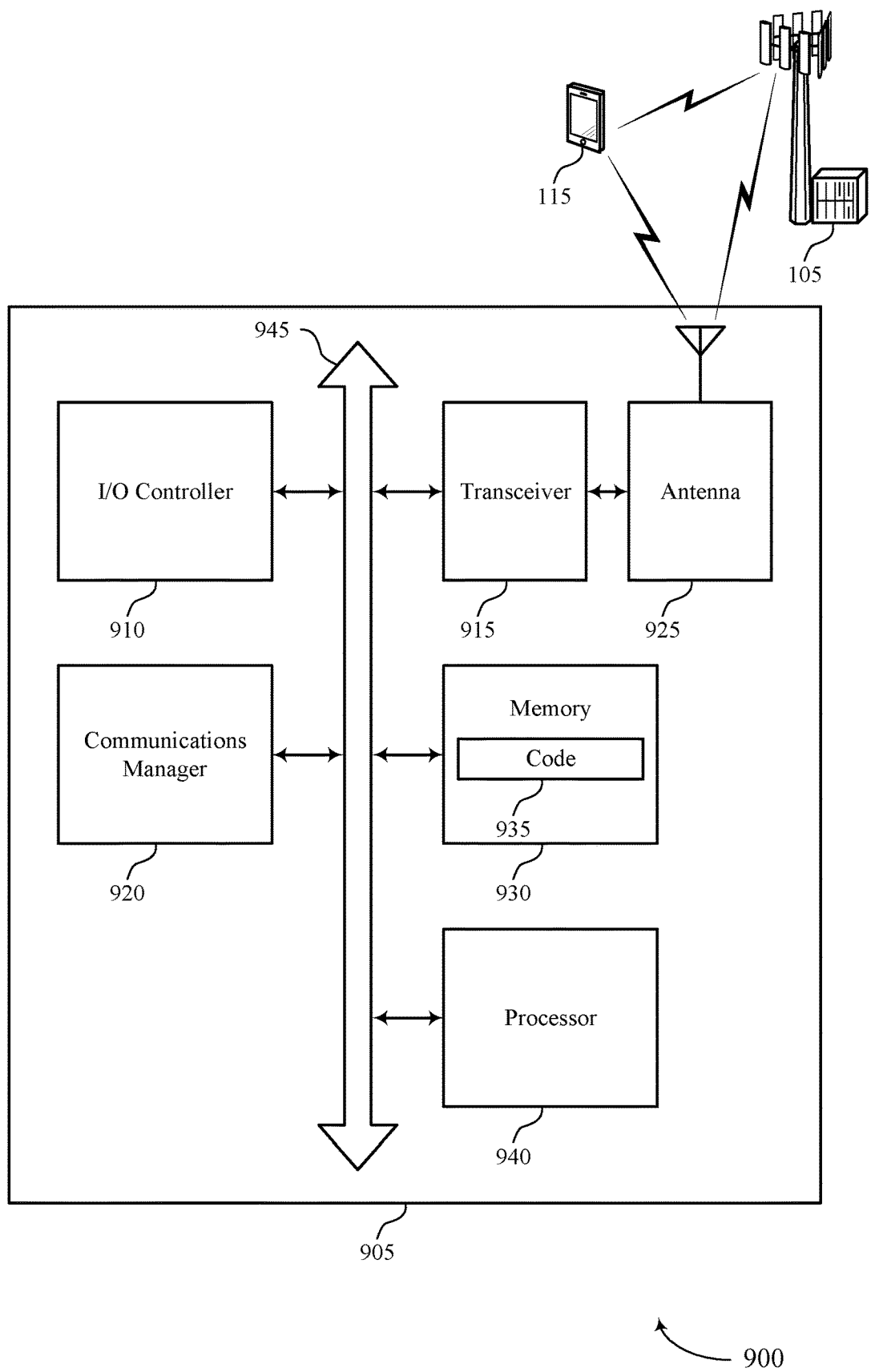
FIG. 9 shows a diagram of a system including a device that supports physical uplink channel repetition for full-duplex communications in accordance with aspects of the present disclosure.

FIG. 9 shows a diagram of a system 900 including a device 905 that supports physical uplink channel repetition for full-duplex communications in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting physical uplink channel repetition for full-duplex communications). For example, the device 905 or a component of the device 905 may include a processor 940 and memory 930 coupled to the processor 940, the processor 940 and memory 930 configured to perform various functions described herein.

The communications manager 920 may support wireless communications at a UE in accordance with examples as disclosed herein. For example, the communications manager 920 may be configured as or otherwise support a means for receiving a configuration for a set of multiple TTIs that include at least one TTI for full-duplex communications. The communications manager 920 may be configured as or otherwise support a means for receiving control signaling indicating a first FDRA for transmitting a physical uplink channel in a first TTI of the set of multiple TTIs. The communications manager 920 may be configured as or otherwise support a means for determining that a second TTI of the set of multiple TTIs is available for a transmission of the physical uplink channel based on a comparison between the first FDRA and resources of the second TTI that are allocated for transmissions different from an uplink transmission, the second TTI being configured for the full-duplex communications. The communications manager 920 may be configured as or otherwise support a means for transmitting one or more repetitions of the physical uplink channel over at least the first TTI and the second TTI based on the determination that the second TTI is available.

By including or configuring the communications manager 920 in accordance with examples as described herein, the device 905 may support techniques for physical uplink channel transmission repetitions in full-duplex communications. For example, the techniques described herein may enable a device 905 to transmit physical uplink channel transmission repetitions in TTIs configured for full-duplex communications, which may support overall improvements in repetition procedures. Accordingly, the device 905 may communicate with a base station more successfully based on increased reliability associated with repetitions. Communications at the device 905 may thus be associated with increased reliability and robustness, which in turn may reduce latency, as failed transmissions and/or subsequent retransmissions may be less likely to occur.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of physical uplink channel repetition for full-duplex communications as described herein, or the processor 940 and the memory 930 may be otherwise configured to perform or support such operations.

Figure 10:
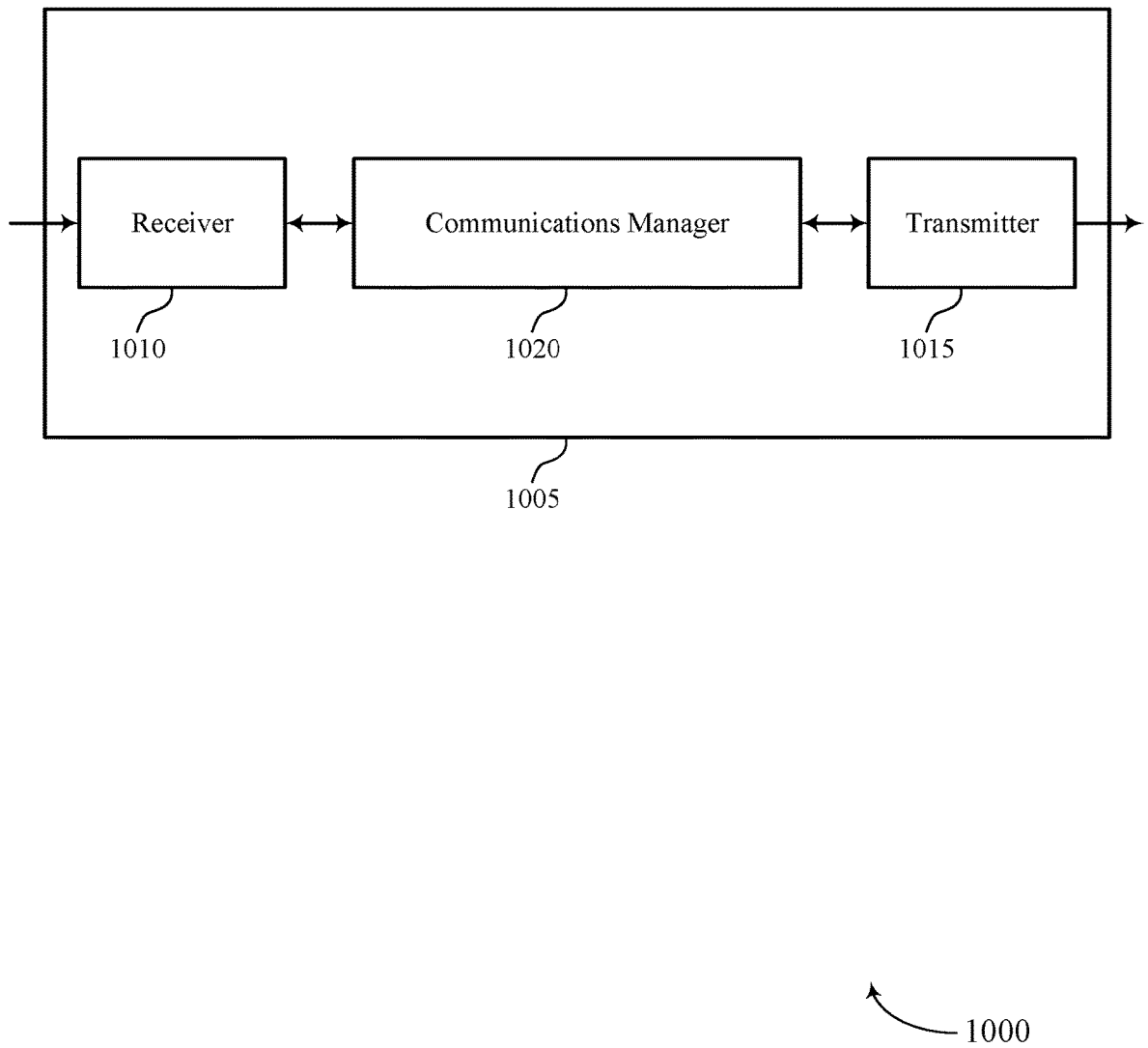
FIGS. 10 and 11 show block diagrams of devices that support physical uplink channel repetition for full-duplex communications in accordance with aspects of the present disclosure.

FIG. 10 shows a block diagram 1000 of a device 1005 that supports physical uplink channel repetition for full-duplex communications in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to physical uplink channel repetition for full-duplex communications). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to physical uplink channel repetition for full-duplex communications). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of physical uplink channel repetition for full-duplex communications as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. For example, the communications manager 1020 may be configured as or otherwise support a means for transmitting, to a UE, a configuration for a set of multiple TTIs that include at least one TTI for full-duplex communications. The communications manager 1020 may be configured as or otherwise support a means for transmitting, to the UE, control signaling indicating a first FDRA for receiving a physical uplink channel in a first TTI of the set of multiple TTIs. The communications manager 1020 may be configured as or otherwise support a means for determining that a second TTI of the set of multiple TTIs is available for a transmission of the physical uplink channel based on a comparison between the first FDRA and resources of the second TTI that are allocated for transmissions different from an uplink transmission, the second TTI being configured for the full-duplex communications. The communications manager 1020 may be configured as or otherwise support a means for receiving, from the UE, one or more repetitions of the physical uplink channel over at least the first TTI and the second TTI based on the availability of the second TTI.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for physical uplink channel transmission repetitions in full-duplex communications. Enabling a relatively larger pool of candidate TTIs for repetition may reduce the overall time taken to perform a repetition procedure. The device 1305 may therefore receive a set of one or more repetitions within a relatively shorter time frame, enabling the device 1305 to conserve power and resources by actively monitoring for a relatively smaller duration of time. Additionally, the device 1305 may conserve power and increase communications efficiency based on a greater likelihood of successful communications associated with transmitting repetitions.

Figure 11:
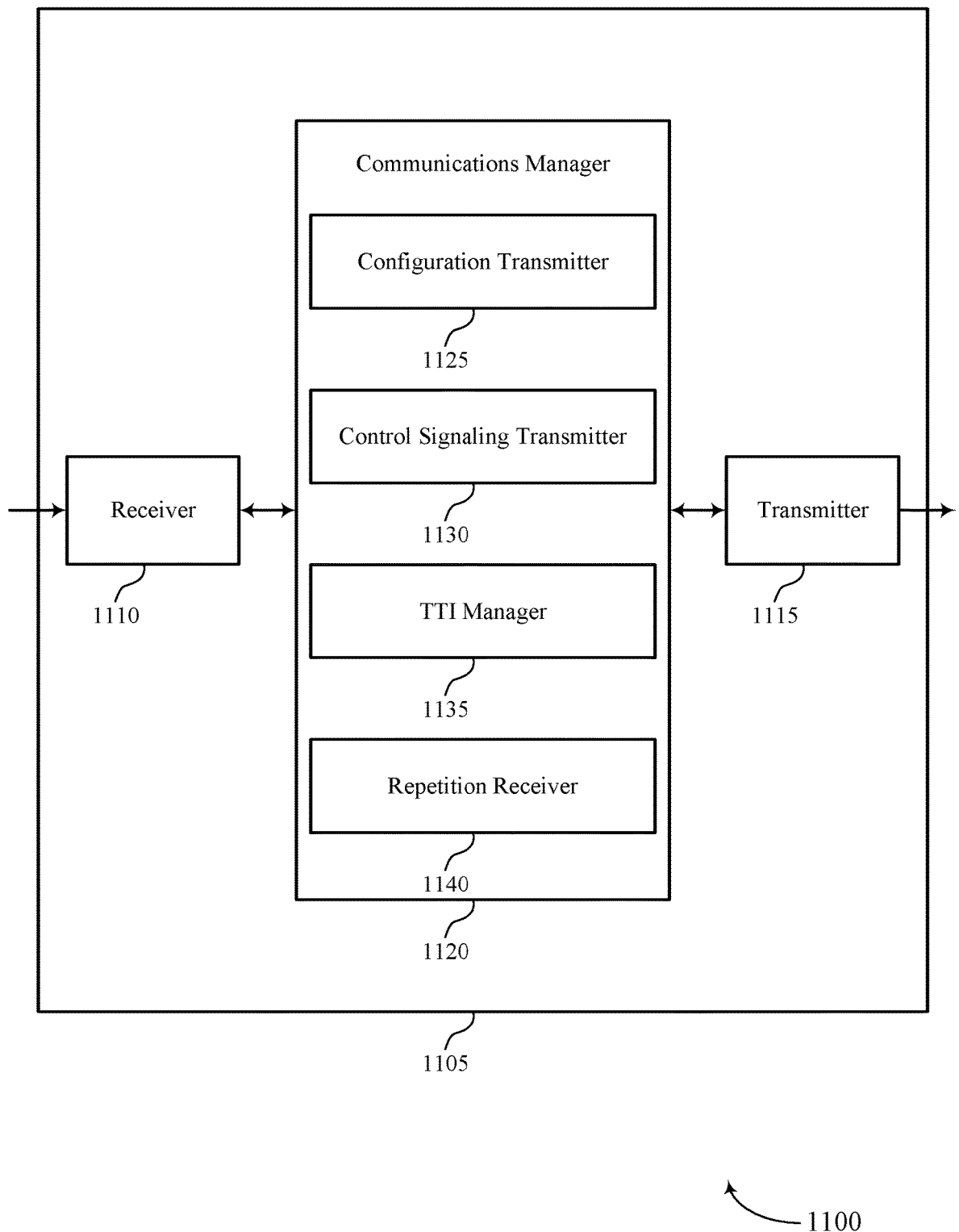

FIG. 11 shows a block diagram 1100 of a device 1105 that supports physical uplink channel repetition for full-duplex communications in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to physical uplink channel repetition for full-duplex communications). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to physical uplink channel repetition for full-duplex communications). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of physical uplink channel repetition for full-duplex communications as described herein. For example, the communications manager 1120 may include a configuration transmitter 1125, a control signaling transmitter 1130, a TTI manager 1135, a repetition receiver 1140, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a base station in accordance with examples as disclosed herein. The configuration transmitter 1125 may be configured as or otherwise support a means for transmitting, to a UE, a configuration for a set of multiple TTIs that include at least one TTI for full-duplex communications. The control signaling transmitter 1130 may be configured as or otherwise support a means for transmitting, to the UE, control signaling indicating a first FDRA for receiving a physical uplink channel in a first TTI of the set of multiple TTIs. The TTI manager 1135 may be configured as or otherwise support a means for determining that a second TTI of the set of multiple TTIs is available for a transmission of the physical uplink channel based on a comparison between the first FDRA and resources of the second TTI that are allocated for transmissions different from an uplink transmission, the second TTI being configured for the full-duplex communications. The repetition receiver 1140 may be configured as or otherwise support a means for receiving, from the UE, one or more repetitions of the physical uplink channel over at least the first TTI and the second TTI based on the availability of the second TTI.

Figure 12:
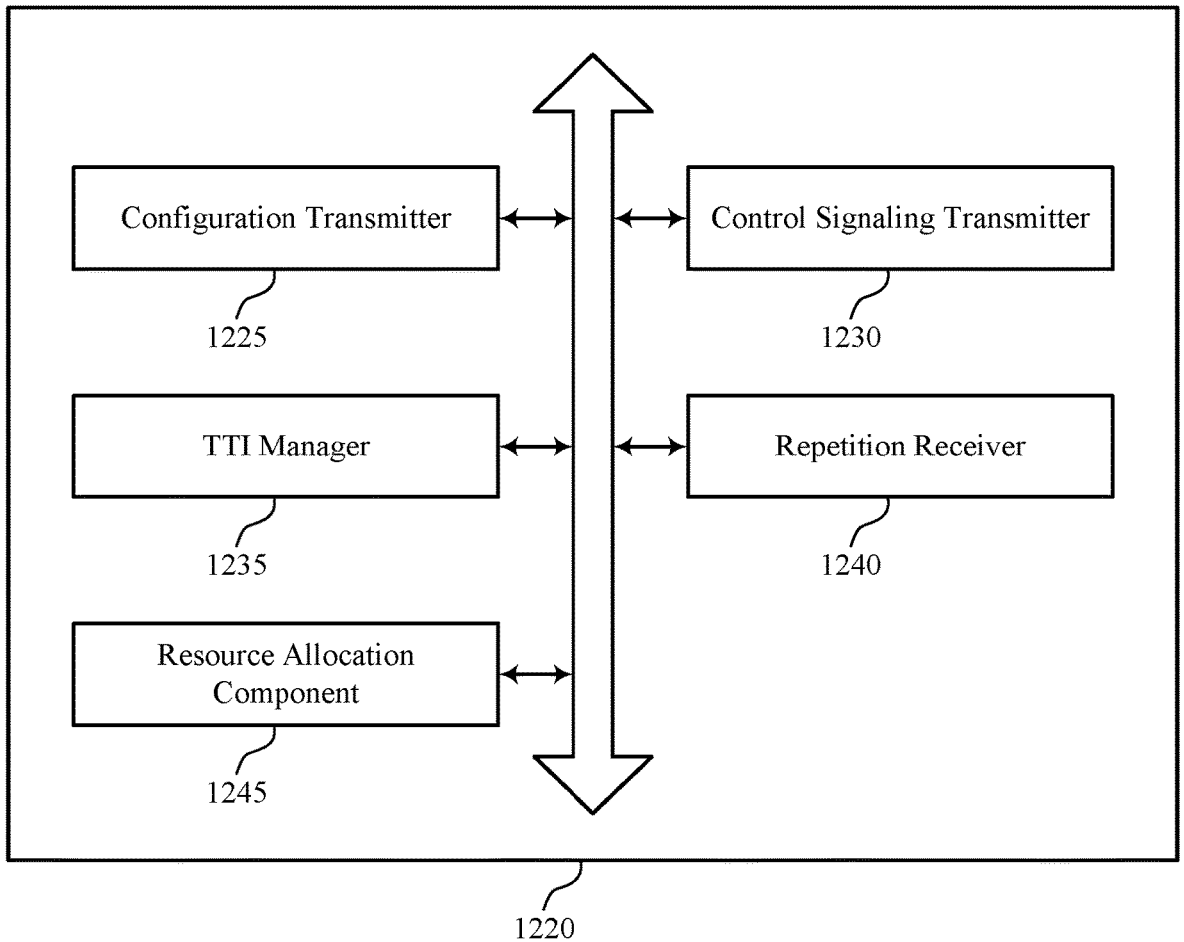
FIG. 12 shows a block diagram of a communications manager that supports physical uplink channel repetition for full-duplex communications in accordance with aspects of the present disclosure.

FIG. 12 shows a block diagram 1200 of a communications manager 1220 that supports physical uplink channel repetition for full-duplex communications in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of physical uplink channel repetition for full-duplex communications as described herein. For example, the communications manager 1220 may include a configuration transmitter 1225, a control signaling transmitter 1230, a TTI manager 1235, a repetition receiver 1240, a resource allocation component 1245, or any combination thereof. Each of these components may communicate, directly or indirectly, with one another (e.g., via one or more buses).

The communications manager 1220 may support wireless communications at a base station in accordance with examples as disclosed herein. The configuration transmitter 1225 may be configured as or otherwise support a means for transmitting, to a UE, a configuration for a set of multiple TTIs that include at least one TTI for full-duplex communications. The control signaling transmitter 1230 may be configured as or otherwise support a means for transmitting, to the UE, control signaling indicating a first FDRA for receiving a physical uplink channel in a first TTI of the set of multiple TTIs. The TTI manager 1235 may be configured as or otherwise support a means for determining that a second TTI of the set of multiple TTIs is available for a transmission of the physical uplink channel based on a comparison between the first FDRA and resources of the second TTI that are allocated for transmissions different from an uplink transmission, the second TTI being configured for the full-duplex communications. The repetition receiver 1240 may be configured as or otherwise support a means for receiving, from the UE, one or more repetitions of the physical uplink channel over at least the first TTI and the second TTI based on the availability of the second TTI.

In some examples, to support determining that the second TTI is available, the resource allocation component 1245 may be configured as or otherwise support a means for determining, based on the comparison, that one or more physical resource blocks indicated by the first FDRA are non-overlapping in a frequency domain with downlink resources of the second TTI, where at least one repetition of the physical uplink channel is received in the second TTI.

In some examples, the resource allocation component 1245 may be configured as or otherwise support a means for determining a second FDRA for receiving the physical uplink channel in the second TTI based on the first FDRA, where at least one repetition of the one or more repetitions is received in the second TTI based on the second FDRA.

In some examples, the resource allocation component 1245 may be configured as or otherwise support a means for transmitting, via the control signaling, an indication of the second FDRA, where the second FDRA is based on transmitting the indication. In some examples, resources of the second FDRA are based on a frequency offset with respect to one or more resources indicated by the first FDRA.

In some examples, the resource allocation component 1245 may be configured as or otherwise support a means for transmitting a message indicating the frequency offset, where the at least one repetition of the one or more repetitions is received in the second TTI based on the message indicating the frequency offset. In some examples, the frequency offset includes a predetermined frequency offset. In some examples, the at least one repetition of the one or more repetitions is received in the second TTI based on the predetermined frequency offset. In some examples, the second FDRA indicates uplink resources that are non-overlapping in a frequency domain with the resources of the second TTI that are allocated for the transmissions different from the uplink transmission.

In some examples, to support determining that the second TTI is available, the TTI manager 1235 may be configured as or otherwise support a means for determining that a first number of physical resource blocks of the second TTI are available for the transmission of the physical uplink channel based on the second TTI being configured for the full-duplex communications, where the first number of physical resource blocks is different from a second number of physical resource blocks of the first TTI, the first TTI being configured for communications different from the full-duplex communications.

In some examples, to support receiving the one or more repetitions of the physical uplink channel, the repetition receiver 1240 may be configured as or otherwise support a means for receiving a first repetition of the one or more repetitions of the physical uplink channel using first frequency-domain resources of the first TTI based on the first FDRA, where one or more resources indicated by the first FDRA are at least partially overlapping with the resources of the second TTI that are allocated for the transmissions different from the uplink transmission. In some examples, to support receiving the one or more repetitions of the physical uplink channel, the repetition receiver 1240 may be configured as or otherwise support a means for receiving a second repetition of the one or more repetitions of the physical uplink channel using second frequency-domain resources of the second TTI that correspond to the first frequency-domain resources based on the first FDRA.

In some examples, a subset of the second frequency-domain resources excludes data based on the subset overlapping with the resources of the second TTI that are allocated for the transmissions different from the uplink transmission.

In some examples, to support receiving the one or more repetitions of the physical uplink channel, the repetition receiver 1240 may be configured as or otherwise support a means for receiving a first repetition of the one or more repetitions of the physical uplink channel over first frequency-domain resources of the first TTI based on the first FDRA, where one or more resources indicated by the first FDRA are at least partially overlapping in a frequency domain with the resources of the second TTI that are allocated for the transmissions different from the uplink transmission. In some examples, to support receiving the one or more repetitions of the physical uplink channel, the repetition receiver 1240 may be configured as or otherwise support a means for receiving a second repetition of the one or more repetitions of the physical uplink channel over second frequency-domain resources of the second TTI that correspond to a subset of the first frequency-domain resources based on the subset being non-overlapping in the frequency domain with the resources of the second TTI that are allocated for the transmissions different from the uplink transmission.

In some examples, to support receiving the one or more repetitions of the physical uplink channel, the repetition receiver 1240 may be configured as or otherwise support a means for receiving the one or more repetitions of the physical uplink channel over at least the first TTI and the second TTI in accordance with a frequency hopping pattern.

In some examples, to support receiving the one or more repetitions of the physical uplink channel, the repetition receiver 1240 may be configured as or otherwise support a means for receiving a first repetition of the one or more repetitions of the physical uplink channel in accordance with a first TDRA for the first TTI. In some examples, to support receiving the one or more repetitions of the physical uplink channel, the repetition receiver 1240 may be configured as or otherwise support a means for receiving a second repetition of the one or more repetitions of the physical uplink channel in accordance with a second TDRA for the second TTI, where the second TDRA is the same as the first TDRA.

Figure 13:
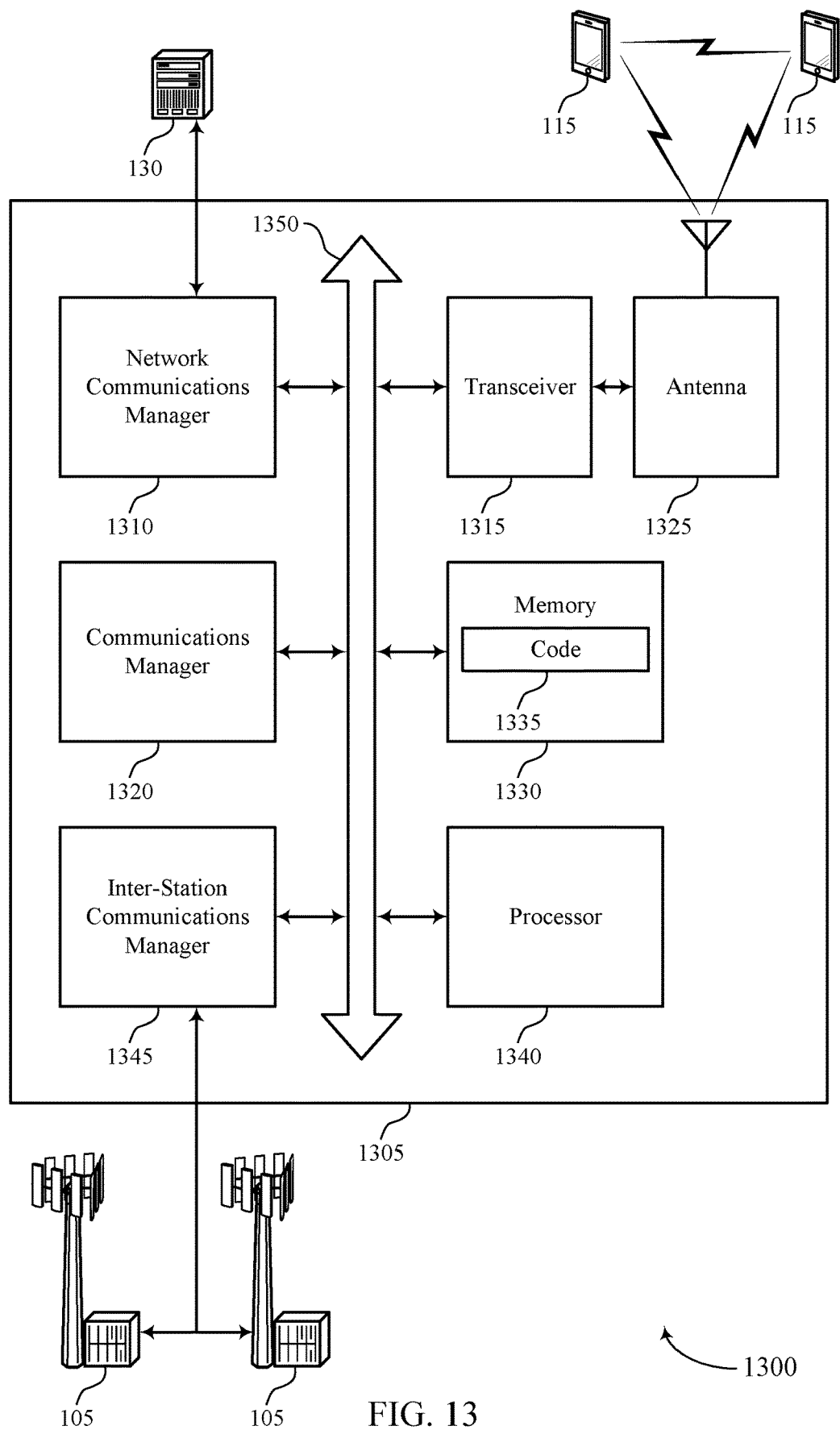
FIG. 13 shows a diagram of a system including a device that supports physical uplink channel repetition for full-duplex communications in accordance with aspects of the present disclosure.

FIG. 13 shows a diagram of a system 1300 including a device 1305 that supports physical uplink channel repetition for full-duplex communications in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting physical uplink channel repetition for full-duplex communications). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communications at a base station in accordance with examples as disclosed herein. For example, the communications manager 1320 may be configured as or otherwise support a means for transmitting, to a UE, a configuration for a set of multiple TTIs that include at least one TTI for full-duplex communications. The communications manager 1320 may be configured as or otherwise support a means for transmitting, to the UE, control signaling indicating a first FDRA for receiving a physical uplink channel in a first TTI of the set of multiple TTIs. The communications manager 1320 may be configured as or otherwise support a means for determining that a second TTI of the set of multiple TTIs is available for a transmission of the physical uplink channel based on a comparison between the first FDRA and resources of the second TTI that are allocated for transmissions different from an uplink transmission, the second TTI being configured for the full-duplex communications. The communications manager 1320 may be configured as or otherwise support a means for receiving, from the UE, one or more repetitions of the physical uplink channel over at least the first TTI and the second TTI based on the availability of the second TTI.

By including or configuring the communications manager 1320 in accordance with examples as described herein, the device 1305 may support techniques for physical uplink channel transmission repetitions in full-duplex communications. For example, the techniques described herein may enable a device 1305 to receive physical uplink channel transmission repetitions in TTIs configured for full-duplex communications, which may support overall improvements in repetition procedures. The device 1305 may therefore receive communications with increased reliability and robustness which in turn may reduce latency, as failed transmissions and/or subsequent retransmissions may be less likely to occur.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of physical uplink channel repetition for full-duplex communications as described herein, or the processor 1340 and the memory 1330 may be otherwise configured to perform or support such operations.

Figure 14:
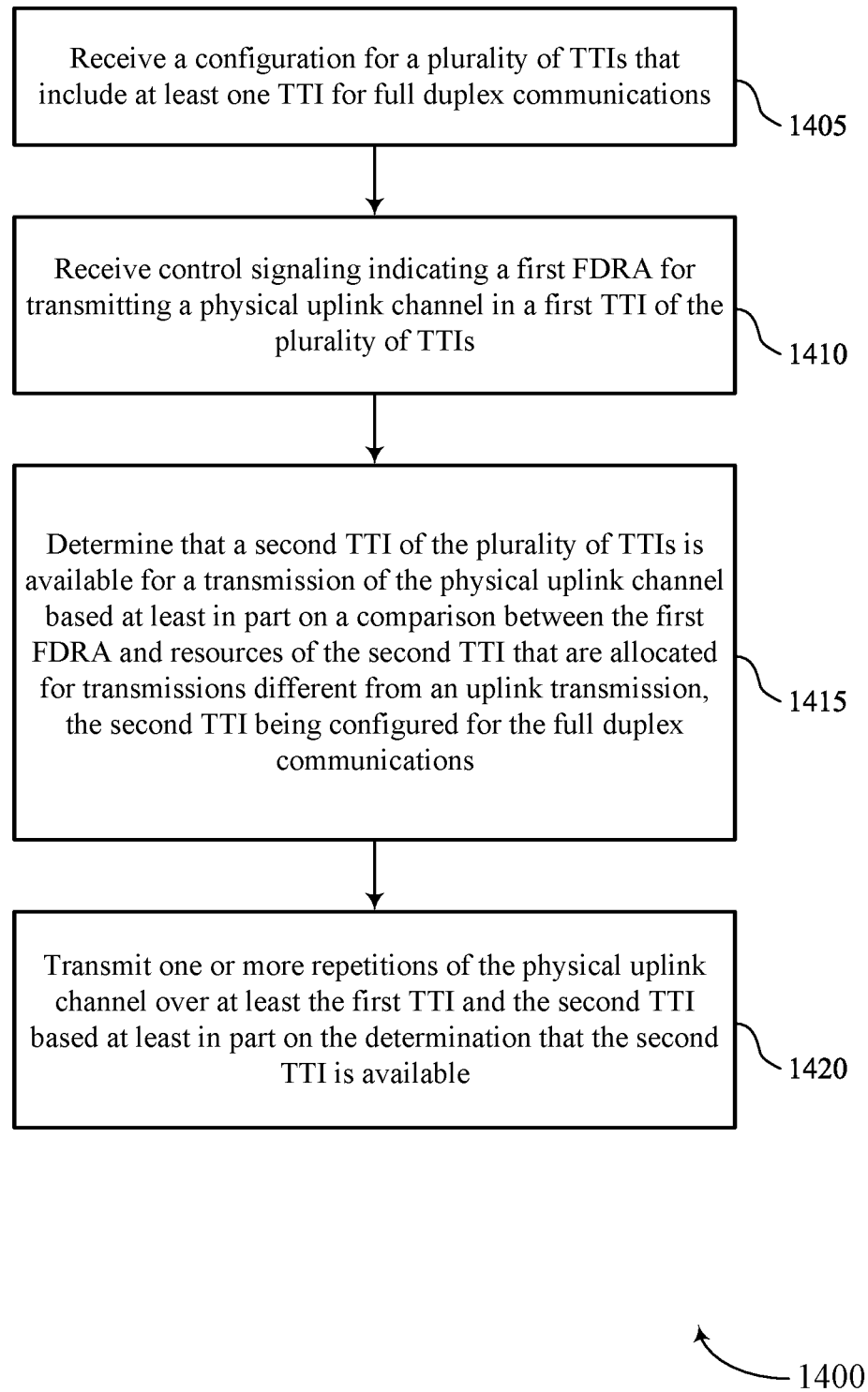
FIGS. 14 through 17 show flowcharts illustrating methods that support physical uplink channel repetition for full-duplex communications in accordance with aspects of the present disclosure.

FIG. 14 shows a flowchart illustrating a method 1400 that supports physical uplink channel repetition for full-duplex communications in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving a configuration for a set of multiple TTIs that include at least one TTI for full-duplex communications. The operations of 1405 may be performed in accordance with examples as disclosed herein. In some examples, aspects of the operations of 1405 may be performed by a configuration receiver 825 as described with reference to FIG. 8.

At 1410, the method may include receiving control signaling indicating a first FDRA for transmitting a physical uplink channel in a first TTI of the set of multiple TTIs. The operations of 1410 may be performed in accordance with examples as disclosed herein. In some examples, aspects of the operations of 1410 may be performed by a control signaling receiver 830 as described with reference to FIG. 8.

At 1415, the method may include determining that a second TTI of the set of multiple TTIs is available for a transmission of the physical uplink channel based on a comparison between the first FDRA and resources of the second TTI that are allocated for transmissions different from an uplink transmission, the second TTI being configured for the full-duplex communications. The operations of 1415 may be performed in accordance with examples as disclosed herein. In some examples, aspects of the operations of 1415 may be performed by a TTI availability component 835 as described with reference to FIG. 8.

At 1420, the method may include transmitting one or more repetitions of the physical uplink channel over at least the first TTI and the second TTI based on the determination that the second TTI is available. The operations of 1420 may be performed in accordance with examples as disclosed herein. In some examples, aspects of the operations of 1420 may be performed by a repetition transmitter 840 as described with reference to FIG. 8.

Figure 15:
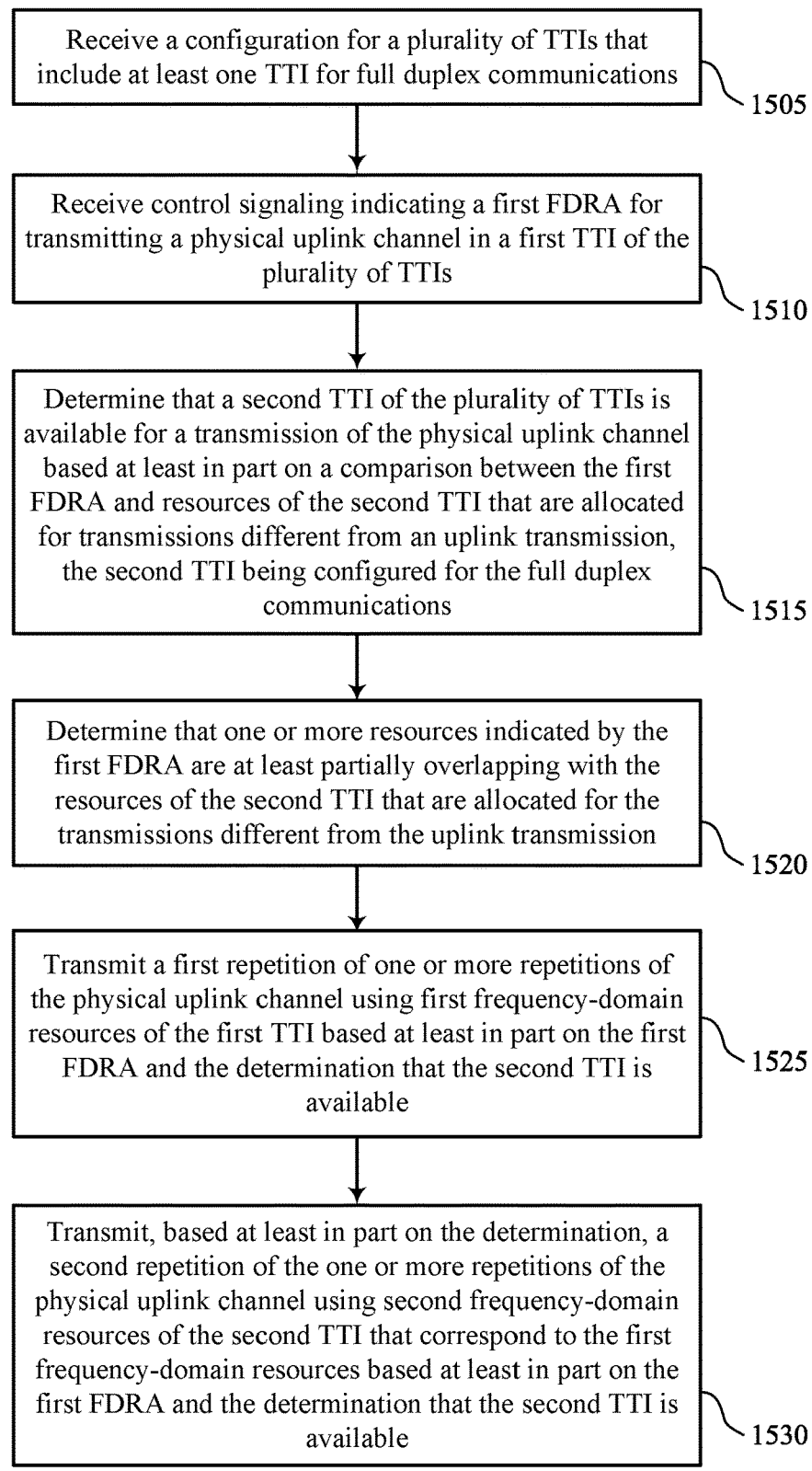

FIG. 15 shows a flowchart illustrating a method 1500 that supports physical uplink channel repetition for full-duplex communications in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include receiving a configuration for a set of multiple TTIs that include at least one TTI for full-duplex communications. The operations of 1505 may be performed in accordance with examples as disclosed herein. In some examples, aspects of the operations of 1505 may be performed by a configuration receiver 825 as described with reference to FIG. 8.

At 1510, the method may include receiving control signaling indicating a first FDRA for transmitting a physical uplink channel in a first TTI of the set of multiple TTIs. The operations of 1510 may be performed in accordance with examples as disclosed herein. In some examples, aspects of the operations of 1510 may be performed by a control signaling receiver 830 as described with reference to FIG. 8.

At 1515, the method may include determining that a second TTI of the set of multiple TTIs is available for a transmission of the physical uplink channel based on a comparison between the first FDRA and resources of the second TTI that are allocated for transmissions different from an uplink transmission, the second TTI being configured for the full-duplex communications. The operations of 1515 may be performed in accordance with examples as disclosed herein. In some examples, aspects of the operations of 1515 may be performed by a TTI availability component 835 as described with reference to FIG. 8.

At 1520, the method may include determining that one or more resources indicated by the first FDRA are at least partially overlapping with the resources of the second TTI that are allocated for the transmissions different from the uplink transmission. The operations of 1520 may be performed in accordance with examples as disclosed herein. In some examples, aspects of the operations of 1520 may be performed by a resource allocation component 850 as described with reference to FIG. 8.

At 1525, the method may include transmitting a first repetition of the one or more repetitions of the physical uplink channel using first frequency-domain resources of the first TTI based on the first FDRA and the determination that the second TTI is available. The operations of 1525 may be performed in accordance with examples as disclosed herein. In some examples, aspects of the operations of 1525 may be performed by a repetition transmitter 840 as described with reference to FIG. 8.

At 1530, the method may include transmitting, based on the determination, a second repetition of the one or more repetitions of the physical uplink channel using second frequency-domain resources of the second TTI that correspond to the first frequency-domain resources based on the first FDRA and the determination that the second TTI is available. The operations of 1530 may be performed in accordance with examples as disclosed herein. In some examples, aspects of the operations of 1530 may be performed by a repetition transmitter 840 as described with reference to FIG. 8.

Figure 16:
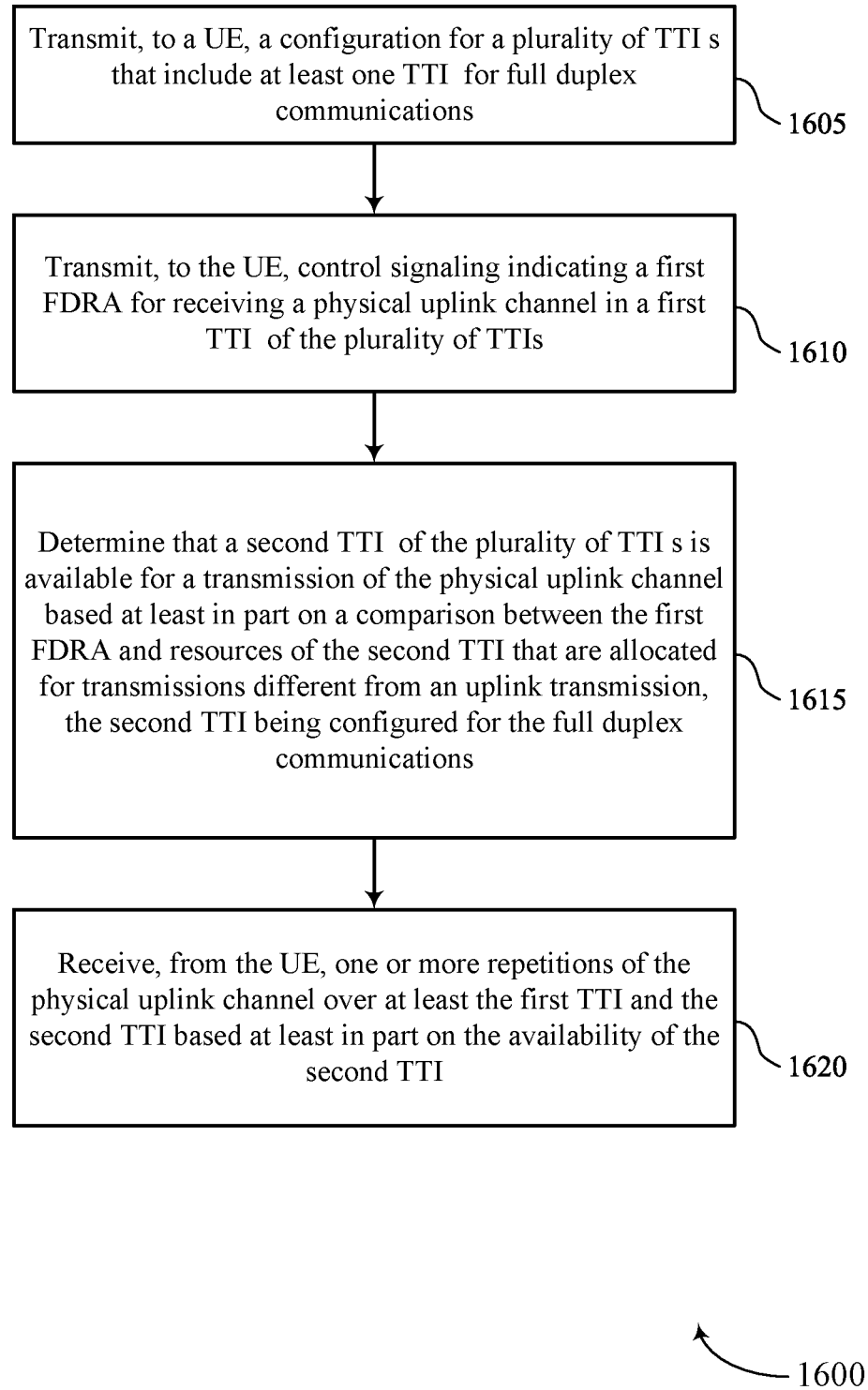

FIG. 16 shows a flowchart illustrating a method 1600 that supports physical uplink channel repetition for full-duplex communications in accordance with aspects of the present disclosure. The operations of the method 1600 may be implemented by a base station or its components as described herein. For example, the operations of the method 1600 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1605, the method may include transmitting, to a UE, a configuration for a set of multiple TTIs that include at least one TTI for full-duplex communications. The operations of 1605 may be performed in accordance with examples as disclosed herein.

In some examples, aspects of the operations of 1605 may be performed by a configuration transmitter 1225 as described with reference to FIG. 12.

At 1610, the method may include transmitting, to the UE, control signaling indicating a first FDRA for receiving a physical uplink channel in a first TTI of the set of multiple TTIs. The operations of 1610 may be performed in accordance with examples as disclosed herein. In some examples, aspects of the operations of 1610 may be performed by a control signaling transmitter 1230 as described with reference to FIG. 12.

At 1615, the method may include determining that a second TTI of the set of multiple TTIs is available for a transmission of the physical uplink channel based on a comparison between the first FDRA and resources of the second TTI that are allocated for transmissions different from an uplink transmission, the second TTI being configured for the full-duplex communications. The operations of 1615 may be performed in accordance with examples as disclosed herein. In some examples, aspects of the operations of 1615 may be performed by a TTI manager 1235 as described with reference to FIG. 12.

At 1620, the method may include receiving, from the UE, one or more repetitions of the physical uplink channel over at least the first TTI and the second TTI based on the availability of the second TTI. The operations of 1620 may be performed in accordance with examples as disclosed herein. In some examples, aspects of the operations of 1620 may be performed by a repetition receiver 1240 as described with reference to FIG. 12.

Figure 17:
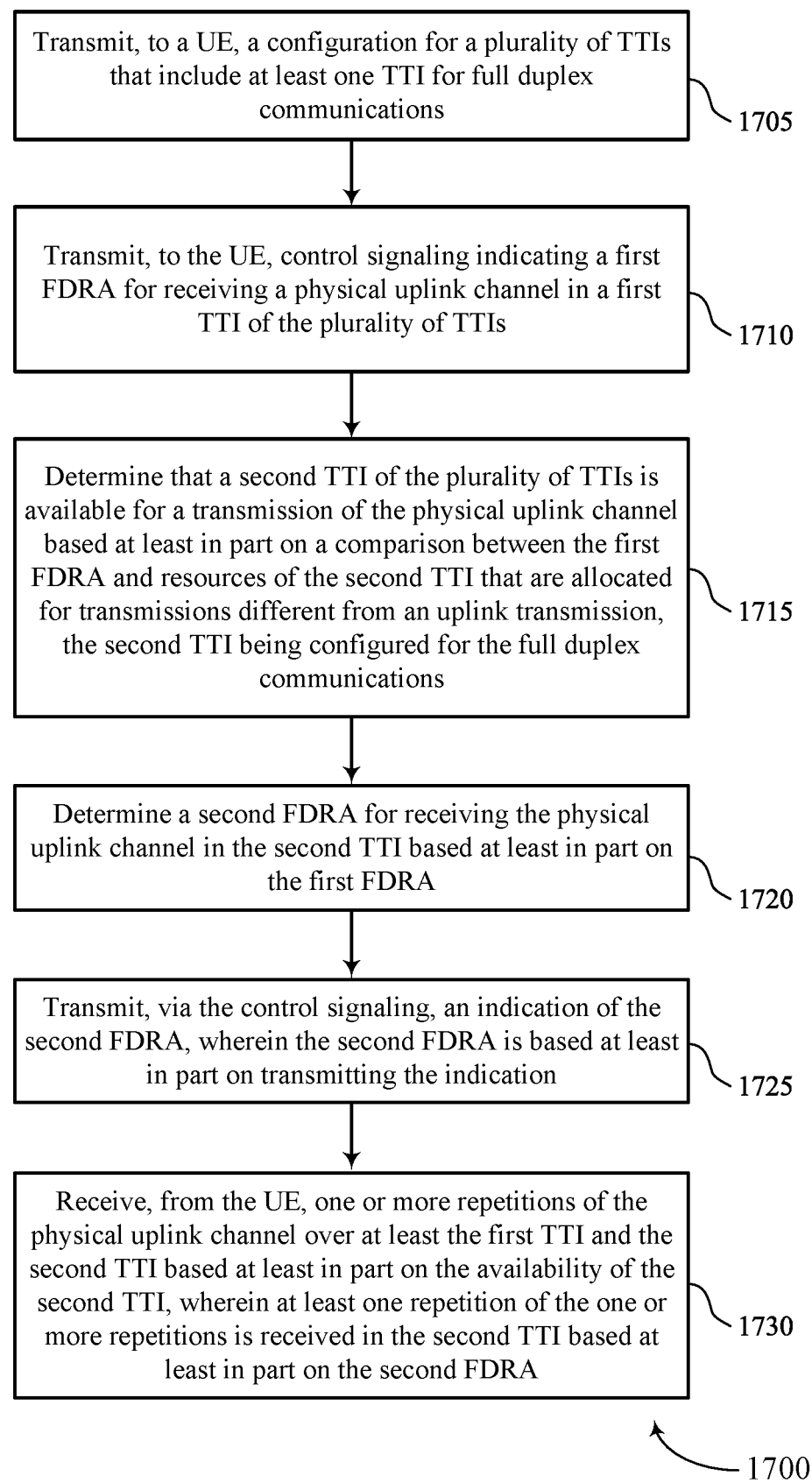

FIG. 17 shows a flowchart illustrating a method 1700 that supports physical uplink channel repetition for full-duplex communications in accordance with aspects of the present disclosure. The operations of the method 1700 may be implemented by a base station or its components as described herein. For example, the operations of the method 1700 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1705, the method may include transmitting, to a UE, a configuration for a set of multiple TTIs that include at least one TTI for full-duplex communications. The operations of 1705 may be performed in accordance with examples as disclosed herein. In some examples, aspects of the operations of 1705 may be performed by a configuration transmitter 1225 as described with reference to FIG. 12.

At 1710, the method may include transmitting, to the UE, control signaling indicating a first FDRA for receiving a physical uplink channel in a first TTI of the set of multiple TTIs. The operations of 1710 may be performed in accordance with examples as disclosed herein. In some examples, aspects of the operations of 1710 may be performed by a control signaling transmitter 1230 as described with reference to FIG. 12.

At 1715, the method may include determining that a second TTI of the set of multiple TTIs is available for a transmission of the physical uplink channel based on a comparison between the first FDRA and resources of the second TTI that are allocated for transmissions different from an uplink transmission, the second TTI being configured for the full-duplex communications. The operations of 1715 may be performed in accordance with examples as disclosed herein. In some examples, aspects of the operations of 1715 may be performed by a TTI manager 1235 as described with reference to FIG. 12.

At 1720, the method may include determining a second FDRA for receiving the physical uplink channel in the second TTI based on the first FDRA. The operations of 1720 may be performed in accordance with examples as disclosed herein. In some examples, aspects of the operations of 1720 may be performed by a resource allocation component 1245 as described with reference to FIG. 12.

At 1725, the method may include transmitting, via the control signaling, an indication of the second FDRA, where the second FDRA is based on transmitting the indication. The operations of 1725 may be performed in accordance with examples as disclosed herein. In some examples, aspects of the operations of 1725 may be performed by a resource allocation component 1245 as described with reference to FIG. 12.

At 1730, the method may include receiving, from the UE, one or more repetitions of the physical uplink channel over at least the first TTI and the second TTI based on the availability of the second TTI, where at least one repetition of the one or more repetitions is received in the second TTI based on the second FDRA. The operations of 1730 may be performed in accordance with examples as disclosed herein. In some examples, aspects of the operations of 1730 may be performed by a repetition receiver 1240 as described with reference to FIG. 12.

The following provides an overview of aspects of the present disclosure:

Aspect 1: A method for wireless communications at a UE, comprising: receiving a configuration for a plurality of TTIs that include at least one TTI for full-duplex communications; receiving control signaling indicating a first FDRA for transmitting a physical uplink channel in a first TTI of the plurality of TTIs; determining that a second TTI of the plurality of TTIs is available for a transmission of the physical uplink channel based at least in part on a comparison between the first FDRA and resources of the second TTI that are allocated for transmissions different from an uplink transmission, the second TTI being configured for the full-duplex communications; and transmitting one or more repetitions of the physical uplink channel over at least the first TTI and the second TTI based at least in part on the determination that the second TTI is available.

Aspect 2: The method of aspect 1, wherein determining that the second TTI is available comprises: determining, based at least in part on the comparison, that one or more PRBs indicated by the first FDRA are non-overlapping in a frequency domain with downlink resources of the second TTI, wherein at least one repetition of the physical uplink channel is transmitted in the second TTI.

Aspect 3: The method of any of aspects 1 through 2, further comprising: determining a second FDRA for transmitting the physical uplink channel in the second TTI based at least in part on the first FDRA for transmitting the physical uplink channel in the first TTI, wherein at least one repetition of the one or more repetitions is transmitted in the second TTI based at least in part on the second FDRA.

Aspect 4: The method of aspect 3, further comprising: receiving, via the control signaling, an indication of the second FDRA, wherein determining the second FDRA is based at least in part on receiving the indication.

Aspect 5: The method of any of aspects 3 through 4, further comprising: calculating uplink resources of the second FDRA based at least in part on a frequency offset with respect to one or more resources indicated by the first FDRA.

Aspect 6: The method of aspect 5, further comprising: receiving a message indicating the frequency offset, wherein the at least one repetition of the one or more repetitions is transmitted in the second TTI based at least in part on the message indicating the frequency offset.

Aspect 7: The method of any of aspects 5 through 6, wherein the frequency offset comprises a predetermined frequency offset, the at least one repetition of the one or more repetitions is transmitted in the second TTI based at least in part on the predetermined frequency offset Aspect 8: The method of any of aspects 3 through 7, wherein the second FDRA indicates uplink resources that are non-overlapping in a frequency domain with the resources of the second TTI that are allocated for the transmissions different from the uplink transmission.

Aspect 9: The method of any of aspects 1 through 8, wherein determining that the second TTI is available comprises: determining that a first number of PRBs of the second TTI are available for the transmission of the physical uplink channel based at least in part on the second TTI being configured for the full-duplex communications, wherein the first number of PRBs is different from a second number of PRBs of the first TTI, the first TTI being configured for communications different from the full-duplex communications.

Aspect 10: The method of any of aspects 1 through 9, wherein transmitting the one or more repetitions of the physical uplink channel comprises: determining that one or more resources indicated by the first FDRA are at least partially overlapping with the resources of the second TTI that are allocated for the transmissions different from the uplink transmission; transmitting a first repetition of the one or more repetitions of the physical uplink channel using first frequency-domain resources of the first TTI based at least in part on the first FDRA; and transmitting, based at least in part on the determination, a second repetition of the one or more repetitions of the physical uplink channel using second frequency-domain resources of the second TTI that correspond to the first frequency-domain resources based at least in part on the first FDRA.

Aspect 11: The method of aspect 10, wherein a subset of the second frequency-domain resources excludes data based at least in part on the subset overlapping with the resources of the second TTI that are allocated for the transmissions different from the uplink transmission.

Aspect 12: The method of any of aspects 1 through 11, wherein transmitting the one or more repetitions of the physical uplink channel comprises: determining that one or more resources indicated by the first FDRA are at least partially overlapping in a frequency domain with the resources of the second TTI that are allocated for the transmissions different from the uplink transmission; transmitting a first repetition of the one or more repetitions of the physical uplink channel using first frequency-domain resources of the first TTI based at least in part on the first FDRA; and transmitting, based at least in part on the determination, a second repetition of the one or more repetitions of the physical uplink channel using second frequency-domain resources of the second TTI that correspond to a subset of the first frequency-domain resources based at least in part on the subset being non-overlapping in the frequency domain with the resources of the second TTI that are allocated for the transmissions different from the uplink transmission.

Aspect 13: The method of any of aspects 1 through 12, wherein transmitting the one or more repetitions of the physical uplink channel comprises: transmitting the one or more repetitions of the physical uplink channel over at least the first TTI and the second TTI in accordance with a frequency hopping pattern.

Aspect 14: The method of any of aspects 1 through 13, wherein transmitting the one or more repetitions of the physical uplink channel comprises: transmitting a first repetition of the one or more repetitions of the physical uplink channel using a first TDRA for the first TTI; and transmitting a second repetition of the one or more repetitions of the physical uplink channel using a second TDRA for the second TTI, wherein the second TDRA is the same as the first TDRA.

Aspect 15: A method for wireless communications at a base station, comprising: transmitting, to a UE, a configuration for a plurality of TTIs that include at least one TTI for full-duplex communications; transmitting, to the UE, control signaling indicating a first FDRA for receiving a physical uplink channel in a first TTI of the plurality of TTIs; determining that a second TTI of the plurality of TTIs is available for a transmission of the physical uplink channel based at least in part on a comparison between the first FDRA and resources of the second TTI that are allocated for transmissions different from an uplink transmission, the second TTI being configured for the full-duplex communications; and receiving, from the UE, one or more repetitions of the physical uplink channel over at least the first TTI and the second TTI based at least in part on the determination that the second TTI is available.

Aspect 16: The method of aspect 15, wherein determining that the second TTI is available comprises: determining, based at least in part on the comparison, that one or more PRBs indicated by the first FDRA are non-overlapping in a frequency domain with downlink resources of the second TTI, wherein at least one repetition of the physical uplink channel is received in the second TTI.

Aspect 17: The method of any of aspects 15 through 16, further comprising: determining a second FDRA for receiving the physical uplink channel in the second TTI based at least in part on the first FDRA, wherein at least one repetition of the one or more repetitions is received in the second TTI based at least in part on the second FDRA.

Aspect 18: The method of aspect 17, further comprising: transmitting, via the control signaling, an indication of the second FDRA, wherein the second FDRA is based at least in part on transmitting the indication.

Aspect 19: The method of any of aspects 17 through 18, wherein resources of the second FDRA are based at least in part on a frequency offset with respect to one or more resources indicated by the first FDRA.

Aspect 20: The method of aspect 19, further comprising: transmitting a message indicating the frequency offset, wherein the at least one repetition of the one or more repetitions is received in the second TTI based at least in part on the message indicating the frequency offset.

Aspect 21: The method of any of aspects 19 through 20, wherein the frequency offset comprises a predetermined frequency offset, the at least one repetition of the one or more repetitions is received in the second TTI based at least in part on the predetermined frequency offset Aspect 22: The method of any of aspects 17 through 21, wherein the second FDRA indicates uplink resources that are non-overlapping in a frequency domain with the resources of the second TTI that are allocated for the transmissions different from the uplink transmission.

Aspect 23: The method of any of aspects 15 through 22, wherein determining that the second TTI is available comprises: determining that a first number of PRBs of the second TTI are available for the transmission of the physical uplink channel based at least in part on the second TTI being configured for the full-duplex communications, wherein the first number of PRBs is different from a second number of PRBs of the first TTI, the first TTI being configured for communications different from the full-duplex communications.

Aspect 24: The method of any of aspects 15 through 23, wherein receiving the one or more repetitions of the physical uplink channel comprises: receiving a first repetition of the one or more repetitions of the physical uplink channel using first frequency-domain resources of the first TTI based at least in part on the first FDRA, wherein one or more resources indicated by the first FDRA are at least partially overlapping with the resources of the second TTI that are allocated for the transmissions different from the uplink transmission; and receiving a second repetition of the one or more repetitions of the physical uplink channel using second frequency-domain resources of the second TTI that correspond to the first frequency-domain resources based at least in part on the first FDRA.

Aspect 25: The method of aspect 24, wherein a subset of the second frequency-domain resources excludes data based at least in part on the subset overlapping with the resources of the second TTI that are allocated for the transmissions different from the uplink transmission.

Aspect 26: The method of any of aspects 15 through 25, wherein receiving the one or more repetitions of the physical uplink channel comprises: receiving a first repetition of the one or more repetitions of the physical uplink channel over first frequency-domain resources of the first TTI based at least in part on the first FDRA, wherein one or more resources indicated by the first FDRA are at least partially overlapping in a frequency domain with the resources of the second TTI that are allocated for the transmissions different from the uplink transmission; and receiving a second repetition of the one or more repetitions of the physical uplink channel over second frequency-domain resources of the second TTI that correspond to a subset of the first frequency-domain resources based at least in part on the subset being non-overlapping in the frequency domain with the resources of the second TTI that are allocated for the transmissions different from the uplink transmission.

Aspect 27: The method of any of aspects 15 through 26, wherein receiving the one or more repetitions of the physical uplink channel comprises: receiving the one or more repetitions of the physical uplink channel over at least the first TTI and the second TTI in accordance with a frequency hopping pattern.

Aspect 28: The method of any of aspects 15 through 27, wherein receiving the one or more repetitions of the physical uplink channel comprises: receiving a first repetition of the one or more repetitions of the physical uplink channel in accordance with a first TDRA for the first TTI; and receiving a second repetition of the one or more repetitions of the physical uplink channel in accordance with a second TDRA for the second TTI, wherein the second TDRA is the same as the first TDRA.

Aspect 29: An apparatus for wireless communications at a UE, comprising a processor; memory coupled with the processor; and instructions stored in the memory and executable by the processor to cause the apparatus to perform a method of any of aspects 1 through 14.

Aspect 30: An apparatus for wireless communications at a UE, comprising at least one means for performing a method of any of aspects 1 through 14.

Aspect 31: A non-transitory computer-readable medium storing code for wireless communications at a UE, the code comprising instructions executable by a processor to perform a method of any of aspects 1 through 14.

Aspect 32: An apparatus for wireless communications at a base station, comprising a processor; memory coupled with the processor; and instructions stored in the memory and executable by the processor to cause the apparatus to perform a method of any of aspects 15 through 28.

Aspect 33: An apparatus for wireless communications at a base station, comprising at least one means for performing a method of any of aspects 15 through 28.

Aspect 34: A non-transitory computer-readable medium storing code for wireless communications at a base station, the code comprising instructions executable by a processor to perform a method of any of aspects 15 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
one or more memories; and
one or more processors coupled with the one or more memories and configured to cause the apparatus to:
receive a configuration for a plurality of transmission time intervals that include at least one transmission time interval for full-duplex communications;
receive control signaling indicating a first frequency domain resource allocation for transmitting a physical uplink channel in a first transmission time interval of the plurality of transmission time intervals; and
transmit one or more repetitions of the physical uplink channel over at least the first transmission time interval and a second transmission time interval based at least in part on the second transmission time interval being available for a transmission of the physical uplink channel, wherein the second transmission time interval is available based at least in part on a comparison between the first frequency domain resource allocation and resources of the second transmission time interval that are allocated for transmissions different from an uplink transmission, the second transmission time interval being configured for the full-duplex communications.

2. The apparatus of claim 1, wherein the one or more processors are configured to cause the apparatus to:
determine, based at least in part on the comparison, that one or more physical resource blocks indicated by the first frequency domain resource allocation are non-overlapping in a frequency domain with downlink resources of the second transmission time interval, wherein at least one repetition of the physical uplink channel is transmitted in the second transmission time interval.

3. The apparatus of claim 1, wherein the one or more processors are configured to cause the apparatus to:
determine a second frequency domain resource allocation for transmitting the physical uplink channel in the second transmission time interval based at least in part on the first frequency domain resource allocation for transmitting the physical uplink channel in the first transmission time interval, wherein at least one repetition of the one or more repetitions is transmitted in the second transmission time interval based at least in part on the second frequency domain resource allocation.

4. The apparatus of claim 3, wherein the one or more processors are configured to cause the apparatus to:
receive, via the control signaling, an indication of the second frequency domain resource allocation, wherein determining the second frequency domain resource allocation is based at least in part on receiving the indication.

5. The apparatus of claim 3, wherein the one or more processors are configured to cause the apparatus to:
calculate uplink resources of the second frequency domain resource allocation based at least in part on a frequency offset with respect to one or more resources indicated by the first frequency domain resource allocation.

6. The apparatus of claim 5, wherein the one or more processors are configured to cause the apparatus to:
receive a message indicating the frequency offset, wherein the at least one repetition of the one or more repetitions is transmitted in the second transmission time interval based at least in part on the message indicating the frequency offset.

7. The apparatus of claim 5, wherein:
the frequency offset comprises a predetermined frequency offset, and
the at least one repetition of the one or more repetitions is transmitted in the second transmission time interval based at least in part on the predetermined frequency offset.

8. The apparatus of claim 3, wherein the second frequency domain resource allocation indicates uplink resources that are non-overlapping in a frequency domain with the resources of the second transmission time interval that are allocated for the transmissions different from the uplink transmission.

9. The apparatus of claim 1, wherein the one or more processors are configured to cause the apparatus to:
determine that a first number of physical resource blocks of the second transmission time interval are available for the transmission of the physical uplink channel based at least in part on the second transmission time interval being configured for the full-duplex communications, wherein the first number of physical resource blocks is different from a second number of physical resource blocks of the first transmission time interval, the first transmission time interval being configured for communications different from the full-duplex communications.

10. The apparatus of claim 1, wherein, to transmit the one or more repetitions of the physical uplink channel, the one or more processors are configured to cause the apparatus to:
determine that one or more resources indicated by the first frequency domain resource allocation are at least partially overlapping with the resources of the second transmission time interval that are allocated for the transmissions different from the uplink transmission;
transmit a first repetition of the one or more repetitions of the physical uplink channel using first frequency-domain resources of the first transmission time interval based at least in part on the first frequency domain resource allocation; and
transmit, based at least in part on the determination, a second repetition of the one or more repetitions of the physical uplink channel using second frequency-domain resources of the second transmission time interval that correspond to the first frequency-domain resources based at least in part on the first frequency domain resource allocation.

11. The apparatus of claim 10, wherein a subset of the second frequency-domain resources excludes data based at least in part on the subset overlapping with the resources of the second transmission time interval that are allocated for the transmissions different from the uplink transmission.

12. The apparatus of claim 1, wherein, to transmit the one or more repetitions of the physical uplink channel, the one or more processors are configured to cause the apparatus to:
determine that one or more resources indicated by the first frequency domain resource allocation are at least partially overlapping in a frequency domain with the resources of the second transmission time interval that are allocated for the transmissions different from the uplink transmission;
transmit a first repetition of the one or more repetitions of the physical uplink channel using first frequency-domain resources of the first transmission time interval based at least in part on the first frequency domain resource allocation; and
transmit, based at least in part on the determination, a second repetition of the one or more repetitions of the physical uplink channel using second frequency-domain resources of the second transmission time interval that correspond to a subset of the first frequency-domain resources based at least in part on the subset being non-overlapping in the frequency domain with the resources of the second transmission time interval that are allocated for the transmissions different from the uplink transmission.

13. The apparatus of claim 1, wherein, to transmit the one or more repetitions of the physical uplink channel, the one or more processors are configured to cause the apparatus to:
transmit the one or more repetitions of the physical uplink channel over at least the first transmission time interval and the second transmission time interval in accordance with a frequency hopping pattern.

14. The apparatus of claim 1, wherein, to transmit the one or more repetitions of the physical uplink channel, the one or more processors are configured to cause the apparatus to:
transmit a first repetition of the one or more repetitions of the physical uplink channel using a first time domain resource allocation for the first transmission time interval; and
transmit a second repetition of the one or more repetitions of the physical uplink channel using a second time domain resource allocation for the second transmission time interval, wherein the second time domain resource allocation is the same as the first time domain resource allocation.

15. An apparatus for wireless communications at a network device, comprising:
one or more memories; and
one or more processors coupled with the one or more memories and configured to cause the apparatus to:
transmit, to a user equipment (UE), a configuration for a plurality of transmission time intervals that include at least one transmission time interval for full-duplex communications;
transmit, to the UE, control signaling indicating a first frequency domain resource allocation for receiving a physical uplink channel in a first transmission time interval of the plurality of transmission time intervals; and
receive, from the UE, one or more repetitions of the physical uplink channel over at least the first transmission time interval and a second transmission time interval based at least in part on the second transmission time interval being available for a transmission of the physical uplink channel, wherein the second transmission time interval is available based at least in part on a comparison between the first frequency domain resource allocation and resources of the second transmission time interval that are allocated for transmissions different from an uplink transmission, the second transmission time interval being configured for the full-duplex communications.

16. The apparatus of claim 15, wherein the one or more processors are configured to cause the apparatus to:
determine, based at least in part on the comparison, that one or more physical resource blocks indicated by the first frequency domain resource allocation are non-overlapping in a frequency domain with downlink resources of the second transmission time interval, wherein at least one repetition of the physical uplink channel is received in the second transmission time interval.

17. The apparatus of claim 15, wherein one or more processors are configured to cause the apparatus to:
determine a second frequency domain resource allocation for receiving the physical uplink channel in the second transmission time interval based at least in part on the first frequency domain resource allocation, wherein at least one repetition of the one or more repetitions is received in the second transmission time interval based at least in part on the second frequency domain resource allocation.

18. The apparatus of claim 17, wherein one or more processors are configured to cause the apparatus to:
transmit, via the control signaling, an indication of the second frequency domain resource allocation, wherein the second frequency domain resource allocation is based at least in part on transmitting the indication.

19. The apparatus of claim 17, wherein resources of the second frequency domain resource allocation are based at least in part on a frequency offset with respect to one or more resources indicated by the first frequency domain resource allocation.

20. The apparatus of claim 19, wherein one or more processors are configured to cause the apparatus to:
transmit a message indicating the frequency offset, wherein the at least one repetition of the one or more repetitions is received in the second transmission time interval based at least in part on the message indicating the frequency offset.

21. The apparatus of claim 19, wherein:
the frequency offset comprises a predetermined frequency offset, and
the at least one repetition of the one or more repetitions is received in the second transmission time interval based at least in part on the predetermined frequency offset.

22. The apparatus of claim 17, wherein the second frequency domain resource allocation indicates uplink resources that are non-overlapping in a frequency domain with the resources of the second transmission time interval that are allocated for the transmissions different from the uplink transmission.

23. The apparatus of claim 15, wherein the one or more processors are configured to cause the apparatus to:

determine that a first number of physical resource blocks of the second transmission time interval are available for the transmission of the physical uplink channel based at least in part on the second transmission time interval being configured for the full-duplex communications, wherein the first number of physical resource blocks is different from a second number of physical resource blocks of the first transmission time interval, the first transmission time interval being configured for communications different from the full-duplex communications.

24. The apparatus of claim 15, wherein, to receive the one or more repetitions of the physical uplink channel, the one or more processors are configured to cause the apparatus to:
receive a first repetition of the one or more repetitions of the physical uplink channel using first frequency-domain resources of the first transmission time interval based at least in part on the first frequency domain resource allocation, wherein one or more resources indicated by the first frequency domain resource allocation are at least partially overlapping with the resources of the second transmission time interval that are allocated for the transmissions different from the uplink transmission; and
receive a second repetition of the one or more repetitions of the physical uplink channel using second frequency-domain resources of the second transmission time interval that correspond to the first frequency-domain resources based at least in part on the first frequency domain resource allocation.

25. The apparatus of claim 24, wherein a subset of the second frequency-domain resources excludes data based at least in part on the subset overlapping with the resources of the second transmission time interval that are allocated for the transmissions different from the uplink transmission.

26. The apparatus of claim 15, wherein, to receive the one or more repetitions of the physical uplink channel, the one or more processors are configured to cause the apparatus to:
receive a first repetition of the one or more repetitions of the physical uplink channel over first frequency-domain resources of the first transmission time interval based at least in part on the first frequency domain resource allocation, wherein one or more resources indicated by the first frequency domain resource allocation are at least partially overlapping in a frequency domain with the resources of the second transmission time interval that are allocated for the transmissions different from the uplink transmission; and
receive a second repetition of the one or more repetitions of the physical uplink channel over second frequency-domain resources of the second transmission time interval that correspond to a subset of the first frequency-domain resources based at least in part on the subset being non-overlapping in the frequency domain with the resources of the second transmission time interval that are allocated for the transmissions different from the uplink transmission.

27. The apparatus of claim 15, wherein, to receive the one or more repetitions of the physical uplink channel, the one or more processors are configured to cause the apparatus to:
receive the one or more repetitions of the physical uplink channel over at least the first transmission time interval and the second transmission time interval in accordance with a frequency hopping pattern.

28. The apparatus of claim 15, wherein, to receive the one or more repetitions of the physical uplink channel, the one or more processors are configured to cause the apparatus to:
receive a first repetition of the one or more repetitions of the physical uplink channel in accordance with a first time domain resource allocation for the first transmission time interval; and
receive a second repetition of the one or more repetitions of the physical uplink channel in accordance with a second time domain resource allocation for the second transmission time interval, wherein the second time domain resource allocation is the same as the first time domain resource allocation.

29. A method for wireless communications at a user equipment (UE), comprising:
receiving a configuration for a plurality of transmission time intervals that include at least one transmission time interval for full-duplex communications;
receiving control signaling indicating a first frequency domain resource allocation for transmitting a physical uplink channel in a first transmission time interval of the plurality of transmission time intervals; and
transmitting one or more repetitions of the physical uplink channel over at least the first transmission time interval and a second transmission time interval based at least in part on the second transmission time interval being available for a transmission of the physical uplink channel, wherein the second transmission time interval is available based at least in part on a comparison between the first frequency domain resource allocation and resources of the second transmission time interval that are allocated for transmissions different from an uplink transmission, the second transmission time interval being configured for the full-duplex communications.

30. A method for wireless communications at a network device, comprising:
transmitting, to a user equipment (UE), a configuration for a plurality of transmission time intervals that include at least one transmission time interval for full-duplex communications;
transmitting, to the UE, control signaling indicating a first frequency domain resource allocation for receiving a physical uplink channel in a first transmission time interval of the plurality of transmission time intervals; and
receiving, from the UE, one or more repetitions of the physical uplink channel over at least the first transmission time interval and a second transmission time interval based at least in part on the second transmission time interval being available for a transmission of the physical uplink channel, wherein the second transmission time interval is available based at least in part on a comparison between the first frequency domain resource allocation and resources of the second transmission time interval that are allocated for transmissions different from an uplink transmission, the second transmission time interval being configured for the full-duplex communications.

* * * * *